(12) United States Patent
Matsushima

(10) Patent No.: US 11,082,524 B2
(45) Date of Patent: Aug. 3, 2021

(54) INFORMATION PROCESSING APPARATUS, DEVICE MANAGEMENT SYSTEM, AND DEVICE MANAGEMENT METHOD

(71) Applicant: Hiroyuki Matsushima, Kanagawa (JP)

(72) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 16/137,587

(22) Filed: Sep. 21, 2018

(65) Prior Publication Data

US 2019/0109921 A1   Apr. 11, 2019

(30) Foreign Application Priority Data

Oct. 10, 2017   (JP) ............................. JP2017-196924

(51) Int. Cl.
*H04L 29/08* (2006.01)
*H04L 29/12* (2006.01)
*H04L 12/26* (2006.01)

(52) U.S. Cl.
CPC ............ *H04L 67/303* (2013.01); *H04L 43/04* (2013.01); *H04L 61/1541* (2013.01); *H04L 67/02* (2013.01); *H04L 67/306* (2013.01)

(58) Field of Classification Search
CPC ................................ H04L 43/04; H04L 43/83
USPC ......................................................... 709/224
See application file for complete search history.

(56) References Cited

U.S. PATENT DOCUMENTS

| 8,099,527 B2* | 1/2012 | Suzuki | ................. H04L 41/142 709/223 |
| 2010/0323668 A1* | 12/2010 | Matsui | .............. H04M 1/72525 455/412.2 |
| 2014/0101308 A1* | 4/2014 | Wanser | .................. H04L 43/04 709/224 |
| 2014/0250219 A1* | 9/2014 | Hwang | ............... G06F 17/2827 709/224 |

FOREIGN PATENT DOCUMENTS

JP   2016-076252   5/2016

* cited by examiner

*Primary Examiner* — Sibte H Bukhari
(74) *Attorney, Agent, or Firm* — Oblon, McClelland, Maier & Neustadt, L.L.P.

(57) ABSTRACT

An information processing apparatus, a device management system, and a device management method. The device management system includes the information processing apparatus, a device management apparatus, a mediating device, and the device. The device management method include communicating via a network with one or more device management units to manage devices to be managed and one or more mediating devices to collect information on the devices, managing correspondence between the device or the mediating device and the device management unit, collecting management information from the device or the mediating device, determining corresponding device management unit based on the correspondence, and transmitting management information to the corresponding device management unit.

17 Claims, 27 Drawing Sheets

FIG. 4A

EXAMPLE OF APPLICATION MANAGEMENT INFORMATION ~401

| APPLICATION ID | Common Name | NOTIFICATION DESTINATION URL | TERMS OF USE URL |
|---|---|---|---|
| APPLICATION X | xxx.example.com | URL 1 | URL a |
| APPLICATION Y | yyy.example.com | URL 2 | URL b |
| APPLICATION Z | zzz/exasmple.com | URL 3 | URL c |

FIG. 4B

EXAMPLE OF CUSTOMER MANAGEMENT INFORMATION ~402

| CUSTOMER ID | PASSWORD |
|---|---|
| CUSTOMER A | aaaaa |
| CUSTOMER B | bbbbb |

FIG. 4C

EXAMPLE OF MEDIATING DEVICE MANAGEMENT INFORMATION 403

| MEDIATING DEVICE ID | CUSTOMER ID | DESCRIPTION | SETTING |
|---|---|---|---|
| MEDIATING DEVICE 1 | CUSTOMER A | – | (SETTING INFORMATION 1) |
| MEDIATING DEVICE 2 | CUSTOMER B | DEVELOPMENT SECTIONS AREA (SECOND FLOOR) | (SETTING INFORMATION 2) |
| MEDIATING DEVICE 3 | CUSTOMER B | GENERAL AFFAIRS SECTION AREA (FIRST FLOOR) | (SETTING INFORMATION 3) |

FIG. 4D

EXAMPLE OF DEVICE MANAGEMENT INFORMATION 404

| DEVICE ID | MEDIATING DEVICE ID | DESCRIPTION | DEVICE TYPE | IP ADDRESS | STATE |
|---|---|---|---|---|---|
| DEVICE 1 | MEDIATING DEVICE 1 | GENERAL AFFAIRS SECTION | MFP | 192.168.0.100 | (STATE INFORMATION 1) |
| DEVICE 2 | MEDIATING DEVICE 2 | MEETING ROOM A | PROJECTOR | 10.0.0.100 | (STATE INFORMATION 2) |
| DEVICE 3 | MEDIATING DEVICE 3 | FIRST DEVELOPMENT SECTION | 3D PRINTER | 10.0.1.100 | (STATE INFORMATION 3) |
| DEVICE 4 | MEDIATING DEVICE 3 | SECOND DEVELOPMENT SECTION | 3D PRINTER | 10.0.1.101 | (STATE INFORMATION 4) |

FIG. 5A

EXAMPLE OF CUSTOMER-APPLICATION
CORRESPONDENCE INFORMATION _501

| CUSTOMER ID | APPLICATION ID |
|---|---|
| CUSTOMER A | APPLICATION X |
| CUSTOMER B | APPLICATION X |
| CUSTOMER B | APPLICATION Y |
| CUSTOMER B | APPLICATION Z |

FIG. 5B

EXAMPLE OF CUSTOMER-MEDIATING DEVICE
CORRESPONDENCE INFORMATION _502

| CUSTOMER ID | MEDIATING DEVICE ID |
|---|---|
| CUSTOMER A | MEDIATING DEVICE 1 |
| CUSTOMER B | MEDIATING DEVICE 2 |
| CUSTOMER B | MEDIATING DEVICE 3 |

FIG. 5C

EXAMPLE OF MEDIATING DEVICE-APPLICATION CORRESPONDENCE INFORMATION _503

| REGISTRATION NUMBER | CUSTOMER ID | APPLICATION ID | MEDIATING DEVICE ID |
|---|---|---|---|
| 10000000 | CUSTOMER A | APPLICATION X | MEDIATING DEVICE 1 |
| 10000001 | CUSTOMER B | APPLICATION X | MEDIATING DEVICE 2 |
| 10000002 | CUSTOMER B | APPLICATION Y | MEDIATING DEVICE 3 |
| 10000003 | CUSTOMER B | APPLICATION Z | MEDIATING DEVICE 3 |

FIG. 5D

EXAMPLE OF DEVICE-APPLICATION CORRESPONDENCE INFORMATION _504

| DEVICE ID | APPLICATION ID |
|---|---|
| DEVICE 1 | APPLICATION X |
| DEVICE 2 | APPLICATION X |
| DEVICE 3 | APPLICATION Y |
| DEVICE 3 | APPLICATION Z |
| DEVICE 4 | APPLICATION Z |

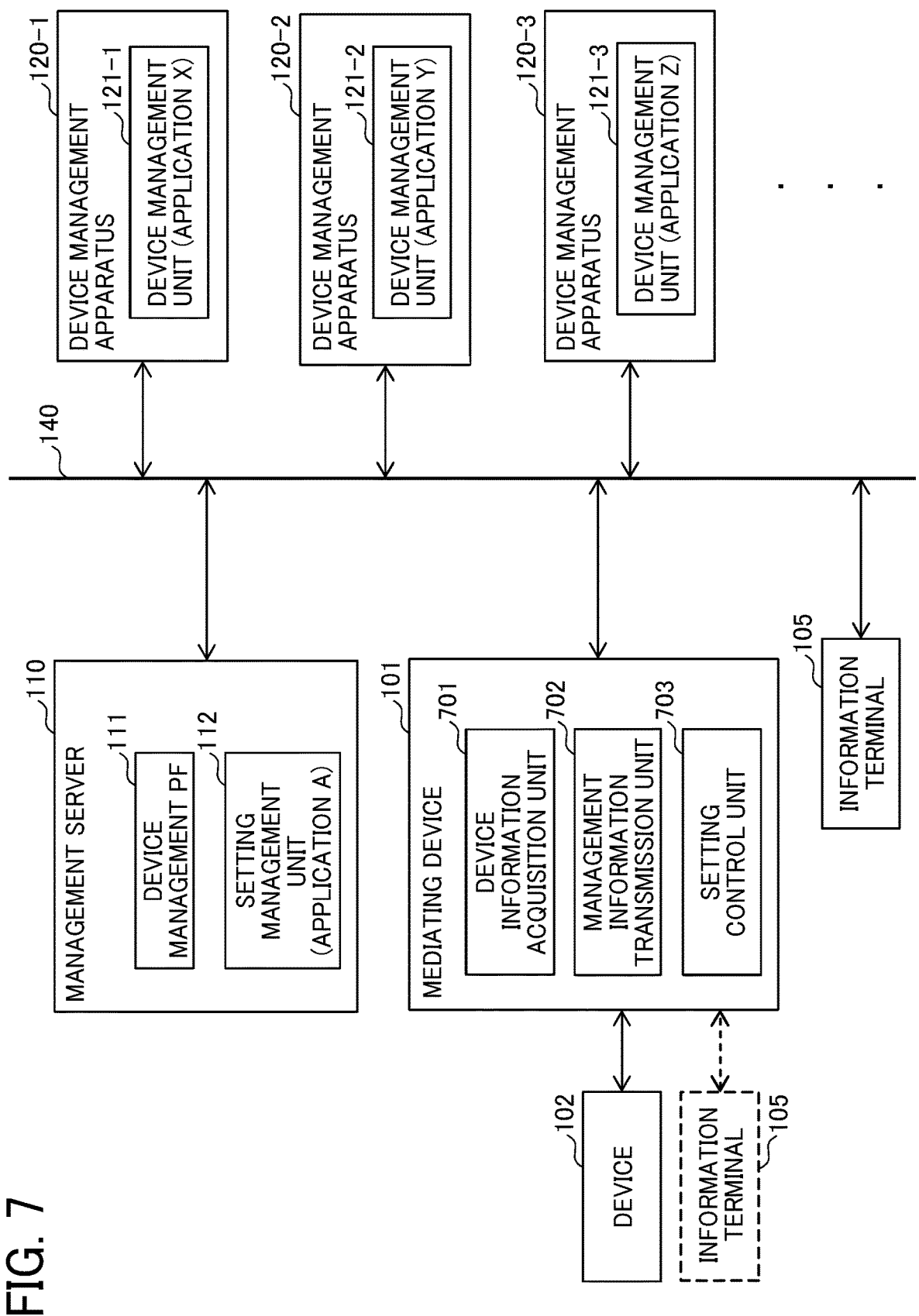

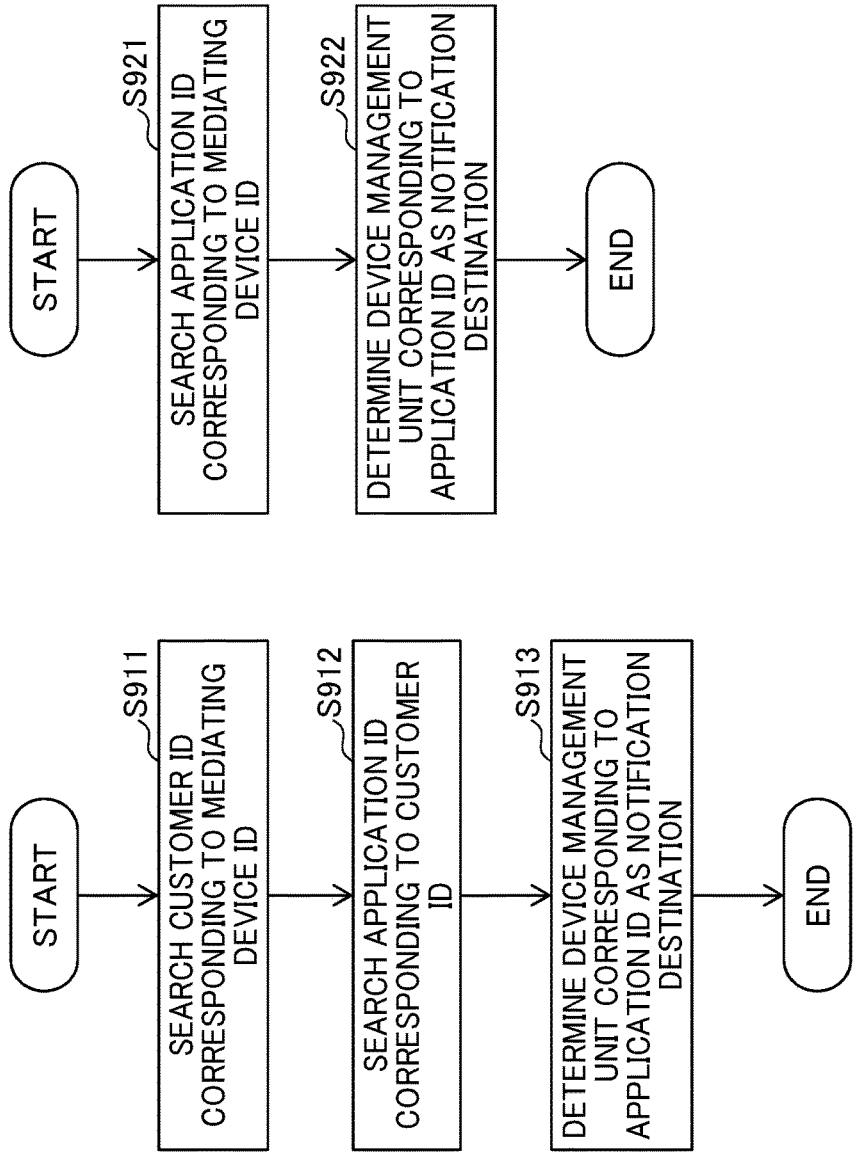

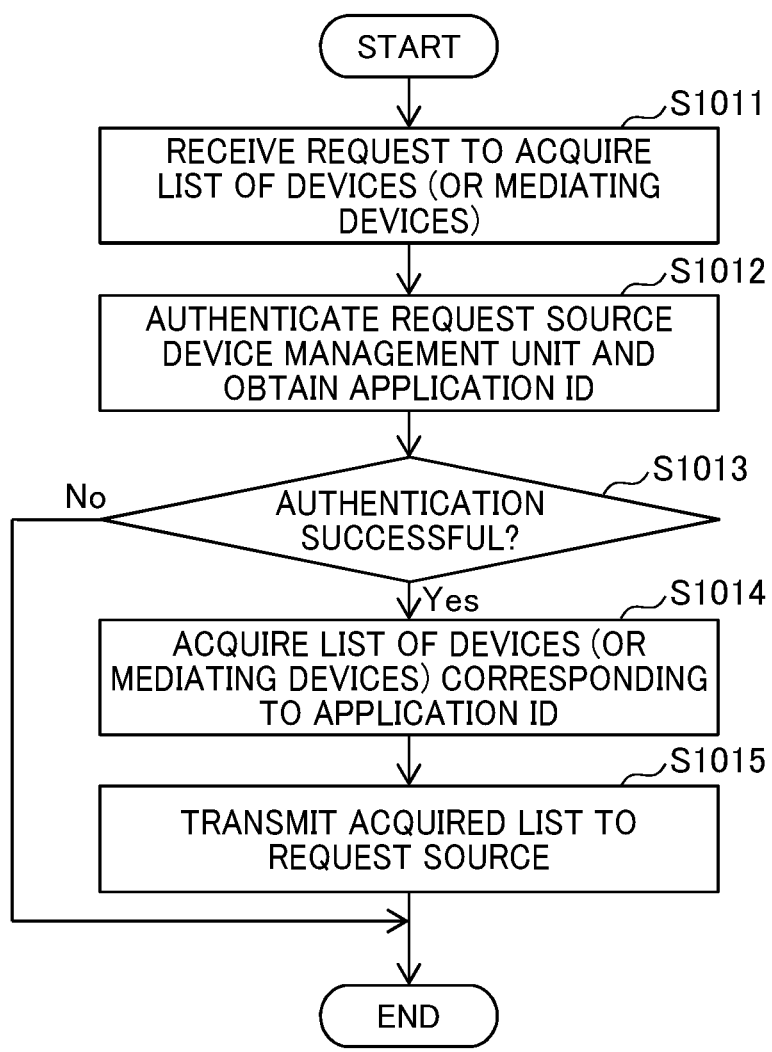

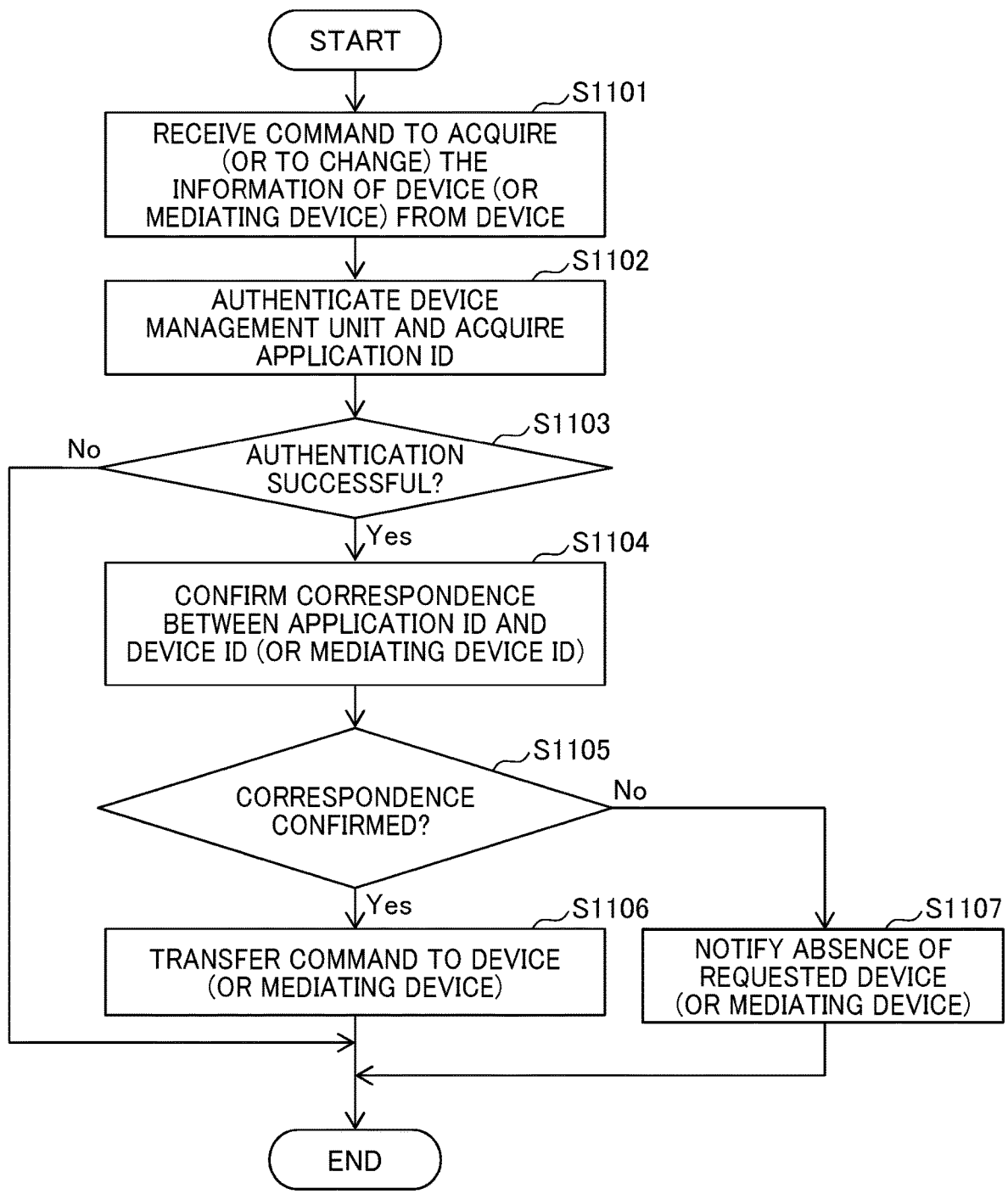

FIG. 13A

EXAMPLE OF REGISTRATION NUMBER INFORMATION    1301

| REGISTRATION NUMBER | CUSTOMER ID | APPLICATION ID | MEDIATING DEVICE ID |
|---|---|---|---|
| 10000002 | CUSTOMER B | APPLICATION Y | |

FIG. 13B

EXAMPLE OF MEDIATING DEVICE-APPLICATION CORRESPONDENCE INFORMATION    503

| REGISTRATION NUMBER | CUSTOMER ID | APPLICATION ID | MEDIATING DEVICE ID |
|---|---|---|---|
| 10000002 | CUSTOMER B | APPLICATION Y | MEDIATING DEVICE 3 |

FIG. 13C

EXAMPLE OF MEDIATING DEVICE MANAGEMENT INFORMATION    403

| MEDIATING DEVICE ID | CUSTOMER ID | DESCRIPTION | SETTING |
|---|---|---|---|
| MEDIATING DEVICE 3 | CUSTOMER B | | |

FIG. 13D

EXAMPLE OF MEDIATING DEVICE-APPLICATION CORRESPONDENCE INFORMATION (AFTER REGISTRATION)    503

| REGISTRATION NUMBER | CUSTOMER ID | APPLICATION ID | MEDIATING DEVICE ID |
|---|---|---|---|
| 10000002 | CUSTOMER B | APPLICATION Y | MEDIATING DEVICE 3 |
| 10000003 | CUSTOMER B | APPLICATION Z | MEDIATING DEVICE 3 |

FIG. 14A

LOGIN SCREEN — 1410

CUSTOMER ID: _____ 1411
PASSWORD: _____ 1412

[ LOGIN ] — 1413

FIG. 14B

MENU SCREEN — 1420

[ ISSUE REGISTRATION NUMBER ] — 1421
[ REGISTER APPLICATION TO USE ] — 1422
[ REGISTER DEVICE ] — 1423
[ SELECT APPLICATION ] — 1424

FIG. 14C

REGISTRATION NUMBER SCREEN — 1430

REGISTRATION NUMBER IS ISSUED

10000002

[ OK ]

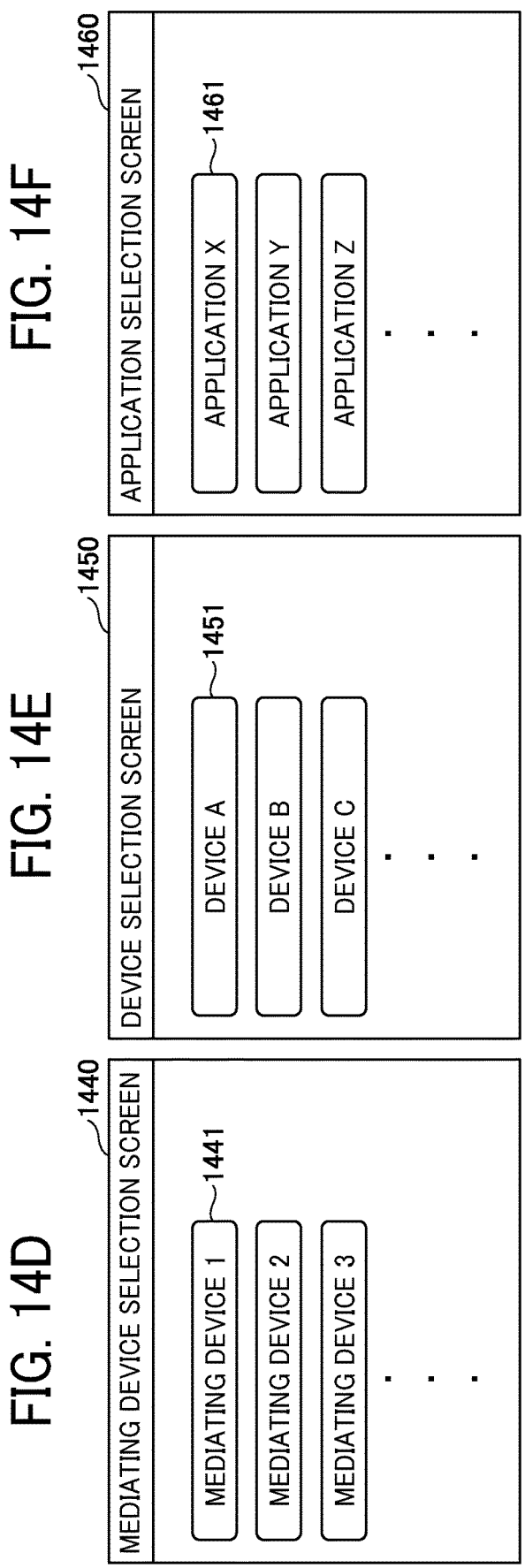

FIG. 16A

ANOTHER EXAMPLE OF MEDIATING DEVICE–APPLICATION CORRESPONDENCE INFORMATION

503

| REGISTRATION NUMBER | CUSTOMER ID | APPLICATION ID | MEDIATING DEVICE ID | ADDITIONAL REGISTRATION |
|---|---|---|---|---|
| 10000002 | CUSTOMER B | APPLICATION Y | MEDIATING DEVICE 3 | NOT ACCEPTABLE |

FIG. 16B

ANOTHER EXAMPLE OF MEDIATING DEVICE MANAGEMENT INFORMATION

403

| MEDIATING DEVICE ID | CUSTOMER ID | DESCRIPTION | SETTING | ADDITIONAL REGISTRATION |
|---|---|---|---|---|
| MEDIATING DEVICE 2 | CUSTOMER B | DEVELOPMENT SECTIONS AREA (SECOND FLOOR) | | ACCEPTABLE |
| MEDIATING DEVICE 3 | CUSTOMER B | GENERAL AFFAIRS SECTION AREA (FIRST FLOOR) | | NOT ACCEPTABLE |

FIG. 16C

ANOTHER EXAMPLE OF APPLICATION MANAGEMENT INFORMATION

401

| APPLICATION ID | Common Name | NOTIFICATION DESTINATION URL | TERMS OF USE URL | REGISTRATION BY SETTING MANAGEMENT UNIT |
|---|---|---|---|---|
| APPLICATION X | xxx.example.com | URL 1 | URL a | REJECT |
| APPLICATION Y | yyy.example.co | URL 2 | URL b | REJECT |
| APPLICATION Z | zzz/exasmple.com | URL 3 | URL c | ACCEPT | and
INFORMATION PROCESSING APPARATUS, DEVICE MANAGEMENT SYSTEM, AND DEVICE MANAGEMENT METHOD

CROSS-REFERENCE TO RELAYED APPLICATION

This patent application is based on and claims priority pursuant to 35 U.S.C. § 119(a) to Japanese Patent Application No. 2017-196924, filed on Oct. 10, 2017, in the Japan Patent Office, the entire disclosure of which is hereby incorporated by reference herein.

BACKGROUND

Technical Field

The present disclosure relates to an information processing apparatus, a device management system, and a device management method.

Discussion of the Background Art

A device management system that collects and manages information on devices to be managed by utilizing a network such as the internet is known. Further, in such a device management system, a mediating device may be provided in a local network in order to manage devices in the local network behind a firewall.

For example, a technology using the mediating device provided in the local network to collect management information from devices in the local network and to transmit the collected management information to a management system outside the local network is known.

SUMMARY

Embodiments of the present disclosure described herein provide an information processing apparatus, a device management system, and a device management method. The device management system includes the information processing apparatus, a device management unit, a mediating device, and the device. The device management method includes communicating via a network with one or more device management units to manage devices to be managed and one or more mediating devices to collect information on the devices, managing correspondence between the device or the mediating device and the device management unit, collecting management information including management information on the device or the mediating device, determining corresponding device management unit from among one or more device management units based on the correspondence, and transmitting management information to the corresponding device management unit.

BRIEF DESCRIPTION OF THE DRAWINGS

A more complete appreciation of the disclosure and many of the attendant advantages and features thereof can be readily obtained and understood from the following detailed description with reference to the accompanying drawings.

FIG. 4A to FIG. 4D are tables illustrating examples of information managed by the device management PF according to an embodiment of the present disclosure.

FIG. 5A to FIG. 5D are tables illustrating examples of information managed by the device management PF according to an embodiment of the present disclosure.

FIG. 7 is a block diagram illustrating a functional configuration of a device management system according to an embodiment of the present disclosure.

FIG. 9A to FIG. 9C are flowcharts illustrating notification destination determination processing according to a first embodiment of the present disclosure.

FIG. 10A and FIG. 10B are flowcharts illustrating information acquisition and change processing according to a second embodiment of the present disclosure.

FIG. 11 is a flowchart illustrating information acquisition and change processing according to the second embodiment of the present disclosure.

FIG. 13A to FIG. 13D are tables illustrating examples of information managed according to an embodiment of the present disclosure.

FIG. 14A to FIG. 14F are diagrams illustrating display screens according to an embodiment of the present disclosure.

FIG. 16A to FIG. 16C are tables illustrating other examples of information managed according to an embodiment of the present disclosure.

Figure 1:
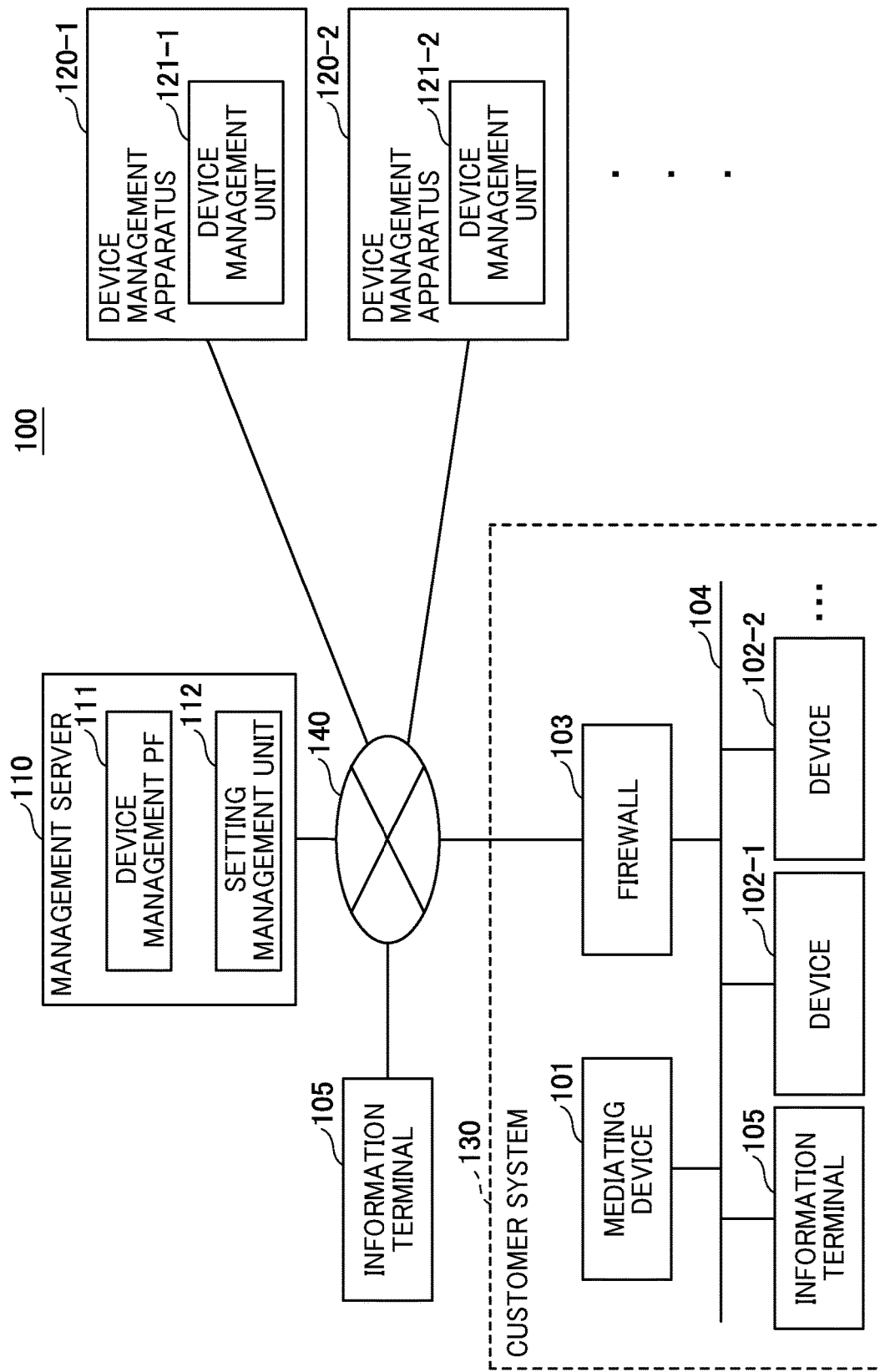
FIG. 1 is a block diagram illustrating a hardware configuration of a device management system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

System Configuration

FIG. 1 is a block diagram illustrating a hardware configuration of a device management system 100 according to an embodiment of the present disclosure. The device management system 100 manages a plurality of devices 102-1, 102-2, and so forth installed in a customer system 130 from a plurality of device management apparatuses 120-1, 120-2, and so forth using the mediating device 101 and the management server 110.

In the following description, "device 102" is used to indicate any device among a plurality of devices 102-1, 102-2, and so forth. In addition, in the following description, "the device management apparatus 120" is used to indicate any device management apparatus among the plurality of device management apparatuses 120-1, 120-2, and so forth.

The device management system 100 includes, for example, the management server 110 connected to a network 140 such as the internet, and the plurality of device management apparatuses 120-1, 120-2, and so forth. The mediating device 101, a plurality of devices 102-1, 102-2, and so forth are connected to a local network 104. The customer system 130 is connected to the network 140 via the firewall 103.

Preferably, the device management system 100 includes an information terminal 105 connected to, for example, the network 140, the local network 104, or the like.

The mediating device 101 is a communication device capable of communicating with the management server 110 via the firewall 103 and the network 140, and collects management information from the device 102 to be managed and transmits the management information to the management server 110. Further, the mediating device 101 notifies the device 102 of the control information notified from the management server 110.

The device 102 is an electronic device having a communication function to be managed by the device management apparatus 120. Examples of the device 102 include various electrical devices such as an image forming apparatus (a printer, a facsimile, a digital multifunction peripheral, a scanner), an office apparatus (a projector, an electronic whiteboard), a vending machine, a medical apparatus, a power supply apparatus, an air conditioner, and metering devices for gas, water, electricity.

The management server 110 is an information processing apparatus capable of communicating with one or more device management units 121 (or device management apparatuses 120) and the mediating device 101 via the network 140. Further, the management server 110 may be a system including a plurality of information processing apparatuses. The management server 110 implements a device management platform (hereinafter "PF") 111, a setting management unit 112, and the like by executing a predetermined program.

The device management PF 111 sends information on the device 102 to the device management unit 121 corresponding to an account (for example, a customer, a contractor, etc.) that has a contract with a service provider that provides a service in accordance with the contract. For example, the device management PF 111 collects information from a plurality of devices 102 transmitted from the mediating device 101 and provides the information on the device 102 to the device management apparatus 120 corresponding to each account selectively.

Also, when receiving the control information (e.g., setting change request, information acquisition request, etc.) for the device 102 corresponding to each account from the device management apparatus 120, the device management PF 111 transmits the received control information to the device 102 corresponding to each account.

As a result, each account can easily manage the device 102 in the local network 104 using the device management apparatus 120 without independently constructing the device management system 100.

The setting management unit 112 is implemented, for example, by a setting application program (hereinafter referred to as an application) prepared by the service provider and is used by a user who manages the system, when setting the system using the information terminal 105 and the like.

The device management apparatus 120 is an information processing apparatus such as a personal computer (PC) provided by the service provider and used by each account. The device management apparatuses 120-1 and 120-2 implement the device management units 121-1 and 121-2, for example, by executing different applications for management of devices. In the following description, "device management unit 121" is used to indicate any device management unit out of the device management units 121-1 and 121-2. In addition, the device management apparatus 120 may have a plurality of device management units 121 by executing a plurality of device management applications.

The device management unit 121 collects and manages information on the device 102 to be managed transmitted from the management server 110. The device management unit 121 performs various management related to the device 102 such as display of the state of the device 102, report of usage amount, acquisition of log, change of setting value, update of firmware, and the like.

The information terminal 105 is for example, a PC used by the user who manages the device management system (for example, the device management apparatus 120, the management server 110, etc.). The user can access the setting management unit 112 of the management server HO and the device management unit 121 of the device management apparatus 120, for example, by using a web browser or the like of the information terminal 105 and make various settings.

With the above configuration of the device management system 100 according to the present embodiment, the management server 110 uses the mediating device 101 and acquires the information on the device 102 to be managed installed in the customer system 130. Further, the management server 110 selectively provides information on the device 102 to the device management apparatus 120 corresponding to the account under contract, as necessary according to the contract.

The system configuration of the device management system 100 illustrated in FIG. 1 is an example. For example, the number of the customer system 130, the mediating device 101, the firewall 103, and the like may be one or any number more than one.

Hardware Configuration

The management server 110, the device management apparatus 120, the mediating device 101, the device 102, the information terminal 105, and the like illustrated in FIG. 1 are implemented as general-purpose computers. Herein, an example of hardware configuration of a general-purpose computer 200 is described below.

Figure 2:
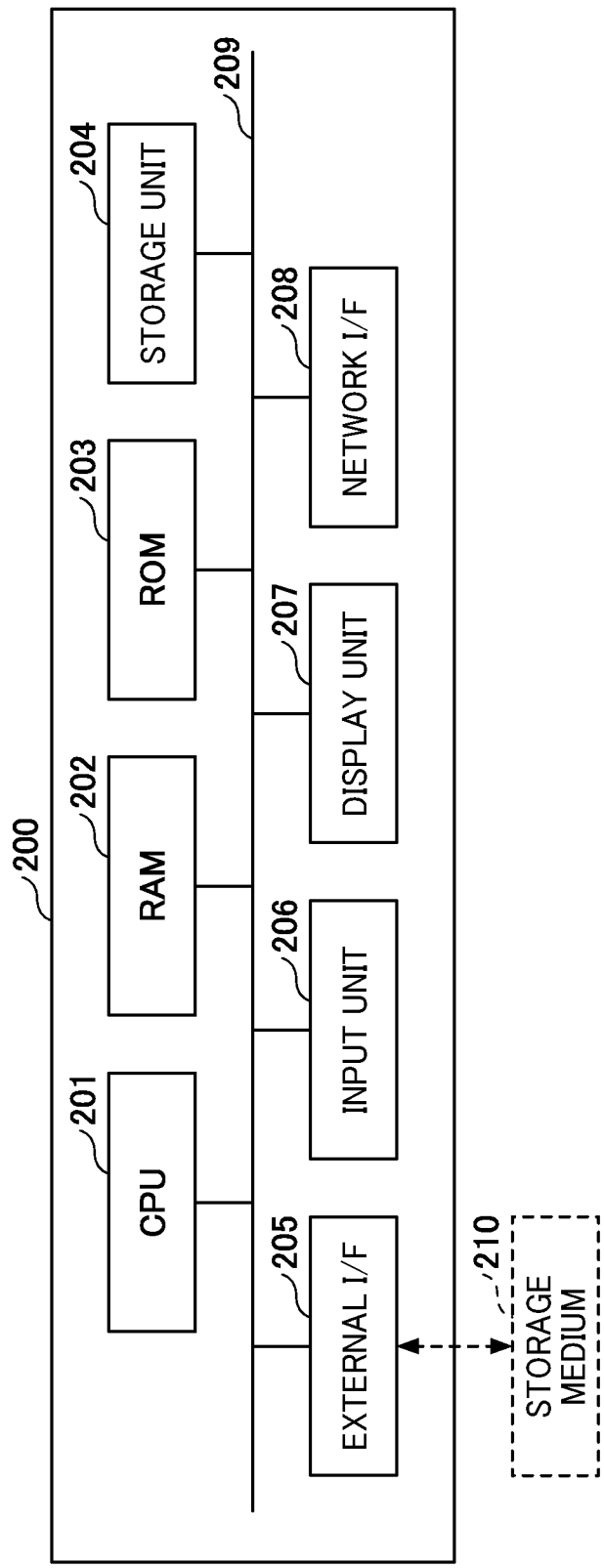
FIG. 2 is a block diagram illustrating a hardware configuration of a computer according to an embodiment of the present disclosure.

FIG. 2 is a block diagram illustrating a hardware configuration of a general-purpose computer according to an embodiment of the present disclosure. The computer 200 includes, for example, a central processing unit (CPU) 201, a random access memory (RAM) 202, a read only memory (ROM) 203, a storage unit 204, an external interface (I/F) 205, an input unit 206, a display unit 207, a network interface (I/F) 208, a bus 209, and the like.

The CPU 201 is an arithmetic device that implements the functions of the computer 200 by reading the programs and data stored in the ROM 203, the storage unit 204, and the like onto the RAM 202 and executing processing. The RAM 202 is a volatile memory used as a work area or the like of the CPU 201. The ROM 203 is a nonvolatile memory capable of holding programs and data even when the power is turned off.

The storage unit 204 is a storage device such as a hard disk drive (HDD), a solid state drive (SSD), and the like, and stores an operating system (OS), an application program, various data, and the like.

The external I/F 205 is an interface with an external device. The external device includes, for example, the storage medium 210 and the like. A predetermined program can be executed by the computer 200, for example, by installing the predetermined program stored in the recording medium 210 via the external I/F 205 on the computer 200.

The input unit 206 is an input device such as a pointing device, a keyboard, a touch panel, or the like for the user to perform an input operation to the computer 200. The display unit 207 is a display device such as a display for displaying the processing result etc. of the computer 200.

The network I/F 208 is a communication interface such as a wired or a wireless local area network (LAN) for connecting the computer 200 to the network 140.

The bus 209 is connected to each of the components mentioned above and transfers an address signal, a data signal and various types of control signals.

Functional Configuration

Figure 3:
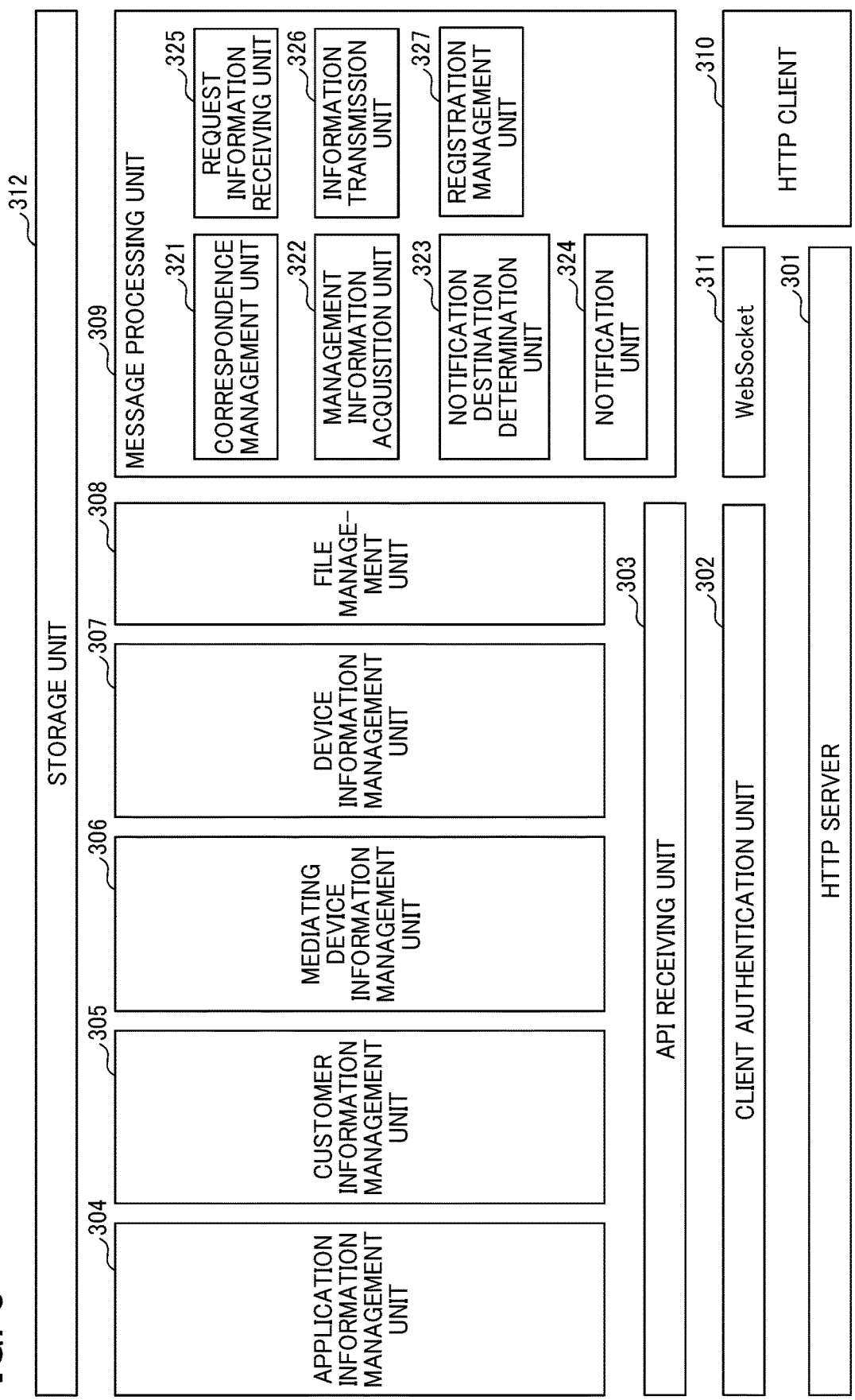
FIG. 3 is a block diagram illustrating a functional configuration of a device management platform according to an embodiment of the present disclosure.

FIG. 3 is a block diagram illustrating a functional configuration of a device management PF according to an embodiment of the present disclosure. The management server 110 implements the device management PF 111 as illustrated in FIG. 3, for example, by executing a predetermined program in the CPU 201 in FIG. 2.

The device management PF 111 includes, for example, a hypertext transfer protocol (HTTP) server 301, a client authentication unit 302, an application program interface (API) receiving unit 303, an application information management unit 304, a customer information management unit 305, a mediating device information management unit 306, a device information management unit 307, a file management unit 308, a message processing unit 309, an HTTP client 310, a WebSocket 311, a storage unit 312, and the like.

The HTTP server 301 is a web server that communicates with client devices such as the device management unit 121, the mediating device 101, and the information terminal 105 using the HTTP.

The client authentication unit 302 authenticates the client device, which requests access to the device management PF 111, such as the device management unit 121, the mediating device 101, and the information terminal 105.

The API receiving unit 303 provides a web API for using the respective functions of the device management PF 111 to the client device successfully authenticated by the client authentication unit 302.

The application information management unit 304 stores and manages, for example, the application management information 401 as illustrated in FIG. 4A in the storage unit 312. In the example of FIG. 4A, the application management information 401 includes information such as an application identification (ID), a common name, a notification destination uniform resource locator (URL), and a terms of use URL.

The application ID is an example of the management unit identification information for identifying the device management unit 121 (or the device management apparatus 120). In the present embodiment, as an example, the device management unit 121 that manages the device 102 to be managed is implemented by the device management application executed by the device management apparatus 120. The device management application is provided by, for example, the service provider (for example, a device manufacturer that manufactures the device 102, an application developer that develops a device management application, or the like) that provides a service using the device management system 100 and may have different functions for each customer.

Common name is information indicating, for example, a domain name (host name) etc. of a server, included in a valid digital certificate used for client authentication and the like. Common name is information used when identifying an application from a digital certificate. A serial number, a subject key identifier, or other information that uniquely identifies the digital certificate may also be used.

Notification destination URL is a URL indicating a destination when transmitting information to the device management unit 121 corresponding to the application ID. Terms of use URL is a URL of terms of use indicating the contract contents corresponding to the application ID.

The customer information management unit 305 stores and manages, for example, the customer management information 402 in the storage unit 312 as illustrated in FIG. 4B. In the example of FIG. 4B, the customer management information 402 includes information such as a customer ID and a password.

The customer ID is an example of account identification information for identifying the account (the customer, the contractor, etc.) having a contract with the service provider. Password is a password corresponding to the account and is an example of authentication information for logging in to the device management PF 111.

The mediating device information management unit 306 stores and manages the mediating device management information 403 in the storage unit 312 as illustrated as an example in FIG. 4C. In the example of FIG. 4C, the mediating device management information 403 includes information such as a mediating device ID, the customer ID, description, and setting.

The mediating device ID is an example of device identification information for identifying the mediating device 101. The mediating device ID is notified to the management server 110 as the common name included in the digital certificate used for client authentication of the mediating device 101, for example.

The customer ID is an example of the account identification information described above. Description is information on the mediating device 101 corresponding to the mediating device ID, and as an example, information such as the place where the mediating device 101 is installed is stored.

Setting is information related to setting of the mediating device 101 corresponding to the mediating device ID, and includes, for example, destination information on the mediating device 101, a time interval (or notification time) at which management information is notified, and various other information is stored.

The device information management unit 307 stores and manages, for example, the device management information 404 in the storage unit 312 as illustrated in FIG. 4D. In the example of FIG. 4D, the device management information 404 includes information such as the device ID, the mediating device ID, description, the device type, the internet protocol (IP) address, and a state.

The device ID is identification information for identifying the device 102 to be managed by the device management system 100. The mediating device ID is identification information on the mediating device 101 described above. The description is information on the device 102 corresponding to the device ID, for example, information indicating a place where the device 102 is installed, and the like are stored.

The device type is information indicating the type of the device 102 corresponding to the device ID. IP address is the IP address of the device 102 corresponding to the device ID. The state is information indicating the state of the device 102 corresponding to the device ID, for example, information indicating on/off of the device 102, information indicating an error state, and the like are stored.

The file management unit 308, for example, controls reading and writing of information in the storage unit 312 when transmitting or receiving information from the device 102 or the mediating device 101.

The message processing unit 309 collects management information, which is information on the device 102 transmitted from the mediating device 101, and sends the management information to the device management apparatus 120. In addition, the message processing unit 309 receives control information, which is information for controlling the device 102 from the device management apparatus 120, and transmits the received control information to the corresponding device 102. The message processing unit 309 includes, for example, a correspondence management unit 321, a management information acquisition unit 322, a notification destination determination unit 323, a notification unit 324, a request information receiving unit 325, an information transmission unit 326, a registration management unit 327, and the like.

The correspondence management unit 321, for example, manages the correspondence between the device 102 or the mediating device 101 and the device management unit 121 based on the contract with each account. There are several methods for managing the correspondence between the device 102 or the mediating device 101 and the device management unit 121. Three such methods are described below.

In a first method, the correspondence management unit 321 stores customer-application correspondence information 501 as illustrated in FIG. 5A and customer-mediating device correspondence information 502 as illustrated in FIG. 5B, thereby managing the correspondence between the mediating device 101 and the device management unit 121.

The customer-application correspondence information (first correspondence information) 501 is information in which the correspondence between the account information for identifying the customer and the device management unit 121 is stored. In the example of FIG. 5A, the correspondence between the customer ID (account information) for identifying the account and the application ID for identifying the device management unit 121 is stored in the customer-application correspondence information 501.

For example, in FIG. 5A, the customer ID "customer A" is associated with the application ID "application X", and the customer ID "customer B" is associated with the application IDs "application X", "application Y" and "application Z". In this manner, a plurality of application IDs may be associated with one customer ID (account), and a plurality of customer IDs may be associated with one application ID.

The customer-mediating device correspondence information (second correspondence information) 502 is information that stores the correspondence between the account information and the mediating device 101. In the example of FIG. 5B, the correspondence between the customer ID for identifying the account and the mediating device ID for identifying the mediating device 101 is stored in the customer-mediating device correspondence information 502.

For example, in FIG. 5B, the customer ID "customer A" is associated with the mediating device ID "mediating device 1", and the customer ID "customer B" is associated with the mediating device ID "mediating device 2" and "mediating device 3". As described above, a plurality of mediating device IDs may be associated with one customer ID. Here, however, it is assumed that one customer ID is associated with one mediating device ID.

As a result, the correspondence management unit 321 can specify the customer ID (account) using the mediating device ID, and can specify the application ID (device management unit 121) corresponding to the specified customer Ill. That is, the correspondence management unit 321 can determine the device management unit 121 corresponding to the mediating device 101 using the mediating device ID.

The correspondence management unit 321 may acquire the correspondence between the customer ID and the mediating device ID from the mediating device management information 403 managed by the mediating device information management unit 306 in place of the customer-mediating device correspondence information 502.

In a second method, the correspondence management unit 321 manages the mediating device-application correspondence information 503 as illustrated in FIG. 5C, and thereby manages the correspondence between the mediating device 101 and the device management unit 121.

The mediating device-application correspondence information (third correspondence information) 503 is information that stores the correspondence between the device management unit 121 and the mediating device 101. The mediating device-application correspondence information 503 stores at least the correspondence between the mediating device ID for identifying the mediating device 101 and the application ID for identifying the device management unit 121.

In the example of FIG. 5C, the mediating device-application correspondence information 503 includes information such as a registration number and the customer ID. The registration number and the customer ID are used in the registration processing of the mediating device to register the mediating device ID in the mediating device-application correspondence information 503. The registration processing of the mediating device is described later.

As illustrated in FIG. 5C, a plurality of mediating device IDs may be associated with one application ID, or a plurality of application IDs may be associated with one mediating device ID. The correspondence management unit 321 can determine the device management unit 121 corresponding to the mediating device 101 using the mediating device ID from the mediating device-application correspondence information 503 as described above.

In a third method, the correspondence management unit 321 manages the device-application correspondence information 504 as illustrated in FIG. 5D and manages the correspondence between the device 102 and the device management unit 121.

The device-application correspondence information (fourth correspondence information) 504 is information that stores the correspondence between the device management unit 121 and the device 102. In the example of FIG. 5D, the correspondence between the device ID for identifying the device 102 and the application ID for identifying the device management unit 121 is stored in the device-application correspondence information 504.

As illustrated in FIG. 5D, a plurality of application IDs may be associated with one device ID, and a plurality of device IDs may be associated with one application ID. As described above, the correspondence management unit 321 can determine the device management unit 121 corresponding to the device 102 by using the device ID and the device-application correspondence information 504.

When it is unnecessary to determine the corresponding device management unit 121 for each device 102, the mediating device 101 corresponding to the device ID may be specified from the device management information (fifth correspondence information) 404, and the device management unit 121 may be determined from the mediating device-application correspondence information 503, instead of referring to the device-application correspondence information 504.

Returning to FIG. 3, the description of the message processing unit 309 is continued.

The management information acquisition unit 322 acquires management information including information on the device 102 from the mediating device 101. The management information acquired by the management information acquisition unit 322 includes, for example, the mediating device ID that identifies the mediating device 101 that transmitted the management information. In addition, the information on the device 102 included in the management information includes the device ID for identifying the device 102.

The notification destination determination unit 323 uses the correspondence between the device 102 or the mediating device 101 and the device management unit 121 managed by the correspondence management unit 321 and determines the device management unit 121 corresponding to the management information acquired by the management information acquisition unit 322. Since the management information acquired by the management information acquisition unit 322 includes the mediating device ID of the mediating device 101 that transmitted the management information and the device ID of the device 102, the notification destination determination unit 323 can specify the mediating device ID and the device management unit 121 corresponding to the device ID.

The notification unit 324 transmits the management information acquired by the management information acquisition unit 322 to the device management unit 121 determined by the notification destination determination unit 323, for example, by using the HTTP client 310.

For example, the HTTP client 310 connects to the HTTP server provided by the device management apparatus 120 and transmits the information to the device management unit 121 using the HTTP protocol.

The request information receiving unit 325 receives various request information such as an information acquisition request, an information change request, and the like, which are transmitted from the device management unit 121 via the HTTP server 301, for example.

The information transmission unit 326 transmits various kinds of control information to the mediating device 101 in the local network 104, for example, by using the WebSocket 311.

The WebSocket 311 is a communication unit for performing bidirectional communication between the server and the client using the WebSocket protocol. It is difficult for the information transmission unit 326 to perform bidirectional communication with the mediating device 101 connected via the firewall 103 using the HTTP client 310. Therefore, in the present embodiment, the information transmission unit 326 transmits control information to the mediating device 101 using the WebSocket 311.

The registration management unit 327 manages registration processing for registering the mediating device 101, the device management unit 121, the device 102, and the like in the device management PF 111. Registration processing of the mediating device 101, the device management unit 121, the device 102, and the like is described later.

Figure 6:
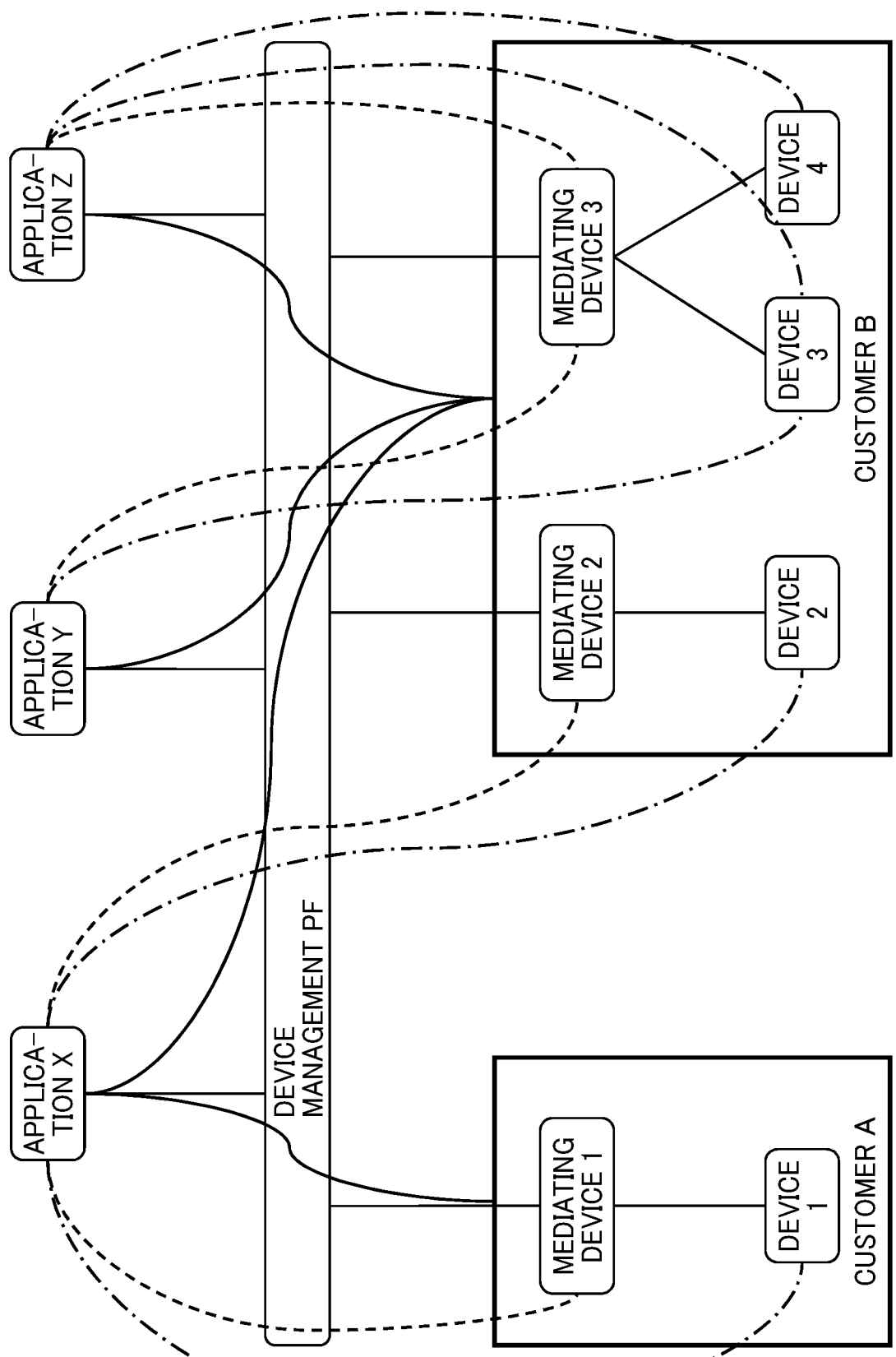
FIG. 6 is a conceptual diagram illustrating relationship of information according to an embodiment of the present disclosure.

FIG. 6 is a conceptual diagram illustrating the correspondence according to an embodiment of the present disclosure. In FIG. 6, the solid lines connecting the application IDs "application X", "application Y", and "application Z" and the customer IDs "customer A" and "customer B" conceptually illustrate the correspondence between each account and each device management unit 121. Further, the broken lines connecting the application IDs "application X", "application Y", and "application Z", the mediating device IIIs "mediating device 1", "mediating device 2", and "mediating device 3" conceptually illustrate the correspondence between each mediating device 101 and each device management unit 121. Further, the alternate long and short dash line connecting the application IDs "application X", "application Y", and "application Z", and the device IDs "device 1", "device 2", "device 3", and "device 4" conceptually illustrate the correspondence between each device 102 and each device management unit 121.

By managing such correspondence, the message processing unit 309 of the device management PF 111 can selectively provide for example, management information corresponding to each device management unit 121 from the management information collected from the mediating device 101.

The storage unit 312 is implemented by, for example, a program executed by the CPU 201, the RAM 202, the storage unit 204, and the like in FIG. 2, and stores various types of information as illustrated in FIG. 4A through FIG. 5D.

FIG. 7 is a block diagram illustrating a functional configuration of the device management system 100 according to an embodiment of the present disclosure. As illustrated in FIG. 7, the device management system 100 includes at least one device management unit 121 for managing the device 102 to be managed, the mediating device 101 for collecting information on the device 102, and the management server 110 capable of communicating via the network 140. The description of the firewall 103 is omitted here since the management server 110 only needs to be able to functionally communicate with the mediating device 101 via the network 140.

The management server 110 implements the setting management unit 112 and the device management PF 111 described in FIG. 3, for example, by executing a predetermined program in the CPU 201.

The setting management unit 112 is implemented by executing a setting management application to configure the device management system 100 in the CPU 201 of the management server 110 and has the application ID "application A" to identify the setting management unit 112.

The mediating device 101 implements a device information acquisition unit 701, a management information transmission unit 702, and a setting control unit 703, for example, by executing a predetermined program in the CPU 201 of the mediating device 101.

The device information acquisition unit 701 acquires information on the device 102 to be managed. The information on the device 102 acquired by the device information acquisition unit 701 includes various information related to the device 102 such as the device ID of the device 102, information indicating the state of the device 102, information indicating the presence or absence of an error in the device 102, and an operation log.

The device information acquisition unit 701 collects information on the device 102, for example, at a predetermined time or at predetermined time intervals. Further, when an error occurs in the device 102, the device information acquisition unit 701 acquires error information and the like sent from the device 102.

The management information transmission unit 702 transmits the management information including the information on the device 102 acquired by the device information acquisition unit 701 to the management server 110. The transmitted management information includes, for example, information on the mediating device 101 including the mediating device ID of the mediating device 101, information on the device 102 including the device ID of the device 102, and the like.

The setting control unit 703 receives the control information transmitted from the management server 110 addressed to the mediating device 101 and controls the settings of the device 102 or the mediating device 101 according to the received control information.

Note that the number of devices 102 for which the mediating device 101 acquires predetermined information may be one or more than one. Also, preferably, the mediating device 101 has a communication interface (for example, a wired LAN interface or the like) for connecting the information terminal 105 for setting the mediating device 101.

The information terminal 105 is also connected to the setting management unit 112 of the management server 110, the device management unit 121 of the device management apparatus 120, etc. via the network 140, and used when setting the device management system 100, etc.

The device management apparatus 120-1 implements, for example, the device management unit 121-1 by executing the device management application of the application ID "application X" by the CPU 201 of the device management apparatus 120-1.

The device management unit 121-1 receives the information on the device 102 (or the mediating device 101) corresponding to the application ID "application X" from the device management PF 111 and uses the device management PF 111 to control settings and the like of the corresponding device 102 (or the mediating device 101).

The device management apparatus 120-2 implements, for example, the device management unit 121-2 by executing the device management application of the application ID "application Y" by the CPU 201 of the device management apparatus 120-2.

The device management unit 121-2 receives the information on the device 102 (or the mediating device 101) corresponding to the application ID "application Y" from the device management PF 111 and uses the device management PF 111 to control the setting of the corresponding device 102 (or the mediating device 101), and the like.

The device management apparatus 120-3 implements, for example, the device management unit 121-3 by executing the device management application of the application ID "application Z" by the CPU 201 of the device management apparatus 120-3.

The device management unit 121-3 receives the information on the device 102 (or the mediating device 101) corresponding to the application ID "application Z" from the device management PF 111 and uses the device management PF 111 to control the setting of the corresponding device 102 (or the mediating device 101).

Note that the device management apparatus 120 may implement, for example, a plurality of device management units 121 by executing a plurality of device management applications with the CPU 201.

Processing

The device management method according to the present embodiment is described below.

First Embodiment

In the first embodiment, the device management PF 111 transmits the management information collected from the mediating device 101 to the corresponding device management unit 121, based on the correspondence managed by the correspondence management unit 321.

Figure 8A:
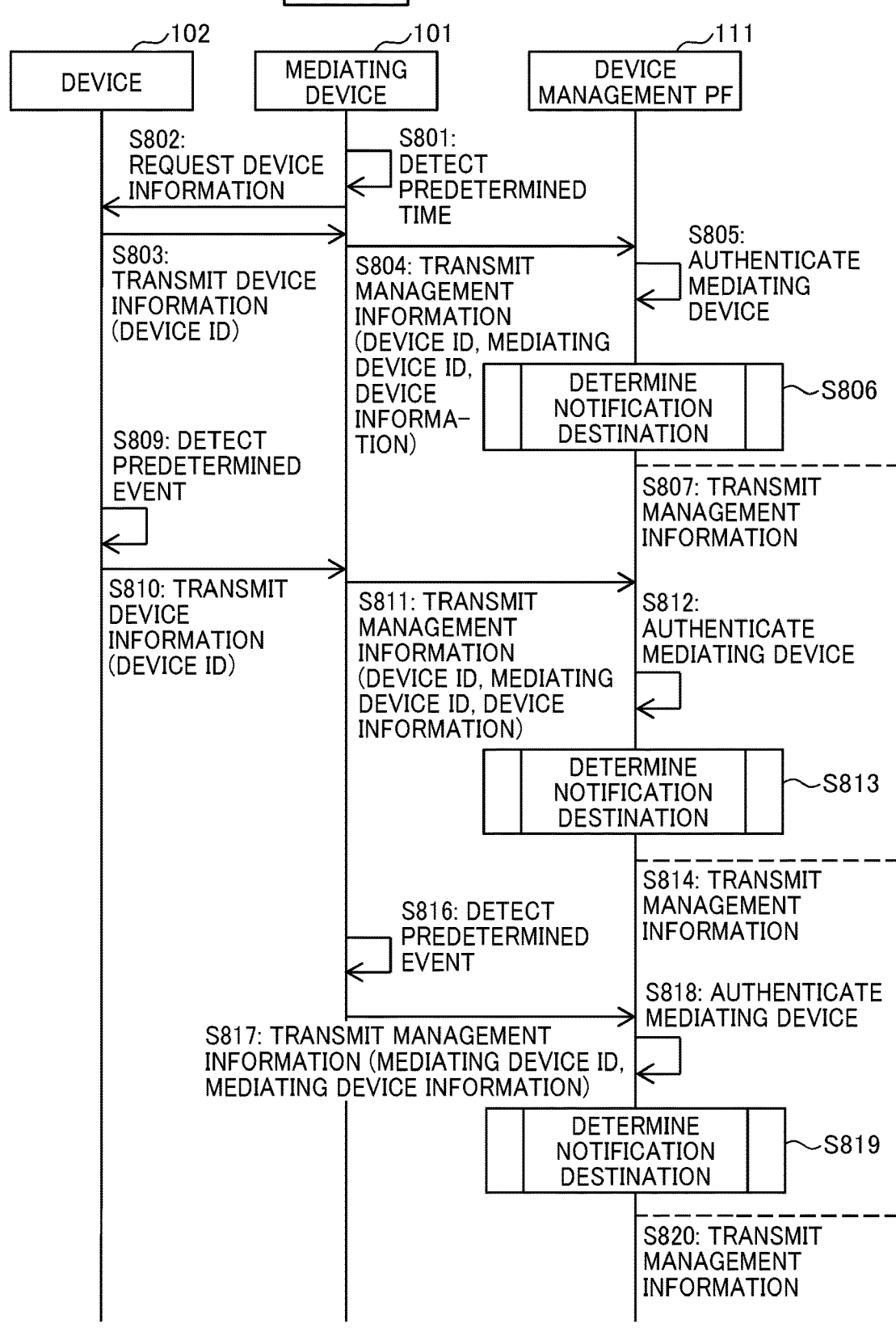
FIG. 8A and FIG. 8B are sequence diagrams illustrating notification processing of management data according to a first embodiment of the present disclosure.
Figure 8B:
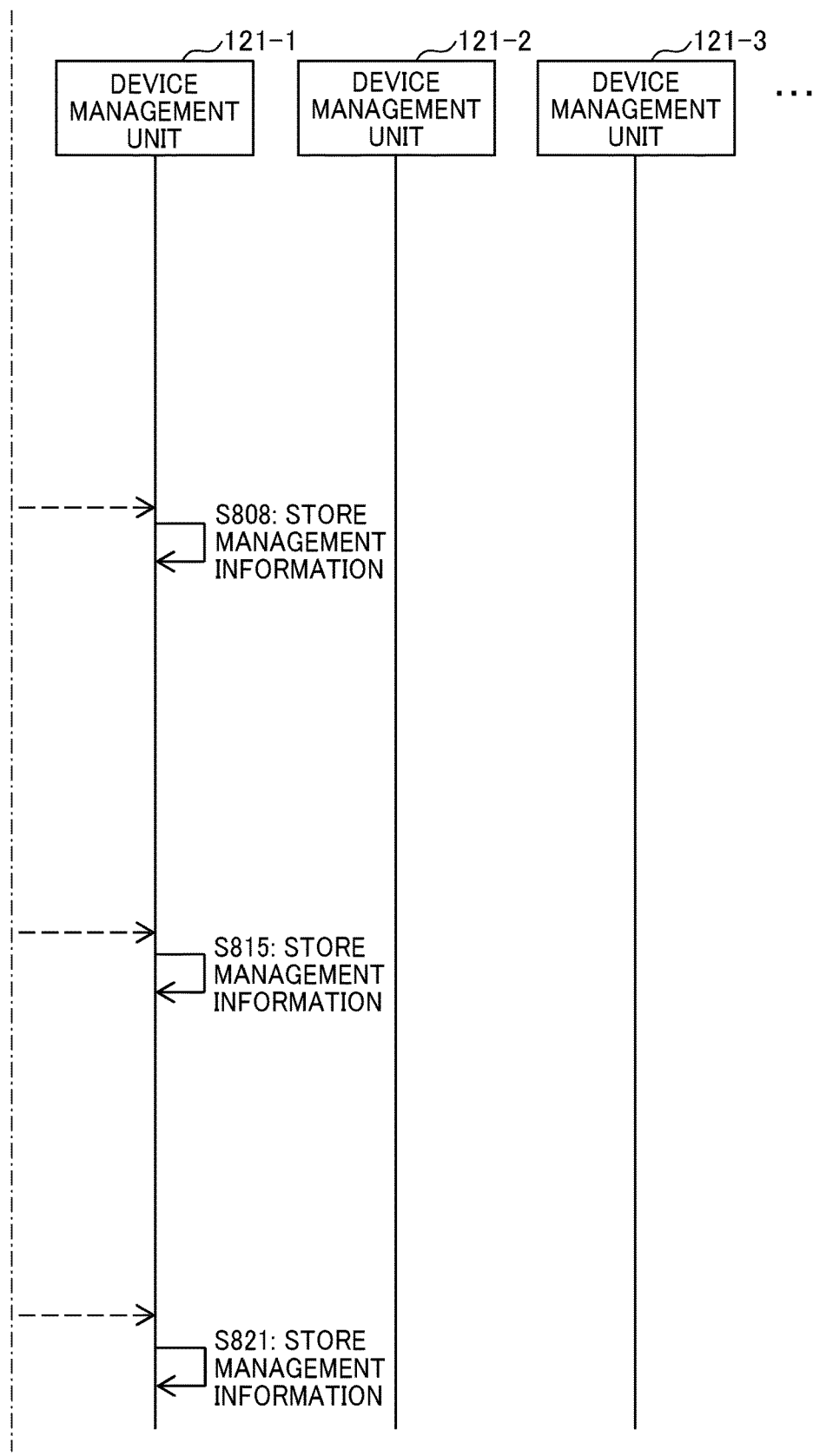

FIG. 8A and FIG. 8B are sequence diagrams illustrating notification processing of management data according to a first embodiment of the present disclosure.

In step S801, the device information acquisition unit 701 of the mediating device 101 detects that the predetermined time has come.

For example, when the device information acquisition unit 701 is set to acquire the management information at a predetermined time interval (for example, six-hour intervals or the like) the device information acquisition unit 701 detects that a predetermined time has elapsed since the management information was acquired last time. Alternatively, when the device information acquisition unit 701 is set to acquire the management information at a predetermined time, the device information acquisition unit 701 detects that the predetermined time has come.

In step S802, the device information acquisition unit 701 of the mediating device 101 requests the device 102 to acquire device information. When there is a plurality of devices 102 to be managed, the mediating device 101 requests device information from each device 102.

In step S803, in response to the request from the mediating device 101, the device 102 transmits the information on the device 102 including the device ID to the mediating device 101.

In step S804, the device information acquisition unit 701 of the mediating device 101 receives the information on the device 102, and the management information transmission unit 702 transmits the management information including the received information on the device 102 to the device management PF 111. The management information transmitted to the device management PF 111 includes, for example, information on the device 102 including the mediating device ID of the mediating device 101 and the device ID of the device 102. Note that the mediating device ID may be transmitted as the common name included in the digital certificate used for client authentication, for example.

In step S805, the client authentication unit 302 of the device management PF 111 authenticates the mediating device 101. When authentication is successful, the device management PF 111 executes step S806.

In step S806, when the management information acquisition unit 322 of the device management PF 111 acquires the management information from the mediating device 101, the notification destination determination unit 323 determines the notification destination which is the device management unit 121 corresponding to the received management information. The notification destination determination processing is described in detail later with reference to FIG. 9.

In step S807, the notification unit 324 of the device management PF 111 notifies (transmits) the device management unit 121 (for example, the device management unit 121-1) determined in the notification destination determination processing of the management information acquired by the management information acquisition unit 322. At this time, the notification unit 324 transmits all or part of the management information acquired by the management information acquisition unit 322 to the determined device management unit 121-1.

In step S808 the device management unit 121-1, for example, stores and manages the management information transmitted from the device management PF 111.

As a result of the above-described processing, the device management system 100 obtains information on the device 102 to be managed by using the mediating device 101 at a predetermined time, and selectively notifies the device management unit 121 managing the device 102.

Further, the management information notification processing is also executed, for example, when a predetermined event is detected by the device 102 or the mediating device 101.

For example, assume that in step S809, the device 102 detects a predetermined event such as a failure of the device 102, a shortage of consumables, a change in settings, and the like.

In step S810, the device 102 transmits the information on the detected predetermined event and the information on the device 102 including the device ID of the device 102 to the mediating device 101.

In step S811, when the device information acquisition unit 701 of the mediating device 101 receives the information on the device 102, the management information transmission unit 702 transmits the management information including the information received from the device 102 to the device management PF 111.

In step S812, the client authentication unit 302 of the device management PF 111 authenticates the mediating device 101. When authentication is successful, the device management PF 111 executes step S813.

In step S813, when the management information acquisition unit 322 of the device management PF 111 acquires the management information from the mediating device 101, the notification destination determination unit 323 executes the same processing as the notification destination determination processing in step S806.

In step S814, the notification unit 324 of the device management PF 111 transmits the management information acquired by the management information acquisition unit 322 to the device management unit 121 (for example, the device management unit 121-1) determined in the notification destination determination processing.

In step S815, for example, the device management unit 121-1 stores and manages the management information transmitted from the device management PF 111.

Further, for example, assume that in step S816, the management information transmission unit 702 of the mediating device 101 detects a predetermined event such as a failure of the mediating device 101, a change in setting, and the like.

In step S817, the management information transmission unit 702 of the mediating device 101 transmits information on the mediating device 101 including information on the detected event, and management information including the mediating device ID, to the device management PF 111.

In step S818, the client authentication unit 302 of the device management PF 111 authenticates the mediating device 101. When authentication is successful, the device management PF 111 executes step S819.

In step S819, when the management information acquisition unit 322 of the device management PF 111 acquires the management information from the mediating device 101, the notification destination determination unit 323 executes the same processing as the notification destination determination processing in step S806.

In step S820, the notification unit 324 of the device management PF 111 transmits the management information acquired by the management information acquisition unit 322 to the device management unit 121 (e.g., the device management unit 121-1) determined in the notification destination determination processing.

In step S821, for example, the device management unit 121-1 stores and manages the management information transmitted from the device management PF 111.

As described above, when a predetermined event is detected by the device 102 or the mediating device 101, notification processing of management information is executed in the device management system 100.

FIG. 9A to FIG. 9C are flowcharts illustrating notification destination determination processing according to a first embodiment of the present disclosure. An example of processing by the notification destination determination unit 323 of the device management PF 111 determining the device management unit 121 as the notification destination of the management information acquired by the management information acquisition unit 322, based on the correspondence managed by the correspondence management unit 321 is described. This processing corresponds to the notification destination determination processing of steps S806, S813, and S819 in FIG. 8A.

FIG. 9A illustrates an example of the processing by the notification destination determination unit 323 of the device management PF 111, determining the device management unit 121 corresponding to the management information acquired by the management information acquisition unit 322 based on the customer-application correspondence information 501 and the customer-mediating device correspondence information 502.

In step S911, the notification destination determination unit 323 searches for the customer ID that corresponds to the mediating device ID included in the management information based on the customer-mediating device correspondence information (second correspondence information) 502 as illustrated in FIG. 5B. For example, in the customer-mediating device correspondence information 502 illustrated in FIG. 5B, when the mediating device ID included in the management information is "mediating device 1", the corresponding customer ID is "customer A".

In step S912, the notification destination determination unit 323 searches for the application ID corresponding to the customer ID retrieved in step S911 based on the customer-application correspondence information (first correspondence information) 501 as illustrated in FIG. 5A. For example, in the customer-application correspondence information 501 illustrated in FIG. 5A, when the customer ID retrieved in step S911 is "customer A", the corresponding application ID is "application X".

In step S913, the notification destination determination unit 323 determines the device management unit 121-1 corresponding to the application ID searched in step S912 as the notification destination of the management information acquired by the management information acquisition unit 322 (the device management unit 121 corresponding to the acquired management information).

FIG. 9B illustrates an example of the notification destination determination unit 323 of the device management PF 111 determining the device management unit 121 corresponding to the management information acquired by the management information acquisition unit 322 based on the mediating device-application correspondence information 503 as illustrated in FIG. 5C.

In step S921, the notification destination determination unit 323 searches for the application ID that corresponds to the mediating device ID included in the management information based on the mediating device-application correspondence information (third correspondence information) 503 as illustrated in FIG. 5C. For example, in the mediating device-application correspondence information 503 illustrated in FIG. 5C, when the mediating device ID included in the management information is "mediating device 1", the corresponding application ID is "application X".

In step S922, the notification destination determination unit 323 sets the device management unit 121-1 corresponding to the application ID searched in step S921 as the notification destination of the management information acquired by the management information acquisition unit 322 (the device management unit 121 corresponding to the acquired management information).

FIG. 9C illustrates an example of the notification destination determination unit 323 of the device management PF 111 determining the device management unit 121 corresponding to the management information acquired by the management information acquisition unit 322 based on the device-application correspondence information 504.

In step S931, the notification destination determination unit 323 searches for the application ID corresponding to the device ID included in the management information based on the device-application correspondence information (fourth correspondence information) 504 as illustrated in FIG. 5D. For example, in the device-application correspondence information 504 illustrated in FIG. 5 D, when the device ID included in the management information is "device 1", the corresponding application ID is "application X".

In step S932, the notification destination determination unit 323 determines the device management unit 121-1 corresponding to the application ID searched in step S931 as the notification destination of the management information acquired by the management information acquisition unit 322 (the device management unit 121 corresponding to the acquired management information).

The method of determining the notification destination illustrated in FIG. 9A to FIG. 9C is an example. The notification destination determination unit 323 of the device management PF 111 determines the device management unit 121 corresponding to the management information acquired by the management information acquisition unit 322 based on the correspondence between the device 102 or the mediating device 101 and the device management unit 121 managed by the correspondence management unit 321.

As described above, according to the present embodiment, in the device management system 100 including one or more device management units 121 that manage the device 102 and the mediating device 101 that collects information on the device 102, necessary information for each device management unit 121 can be selectively provided.

Second Embodiment

In the second embodiment, the device management unit 121 uses the device management PF 111 to, for example, acquire information on the device 102 (or the mediating device 101) and change the setting of the device 102 (or the mediating device 101).

Figure 10B:
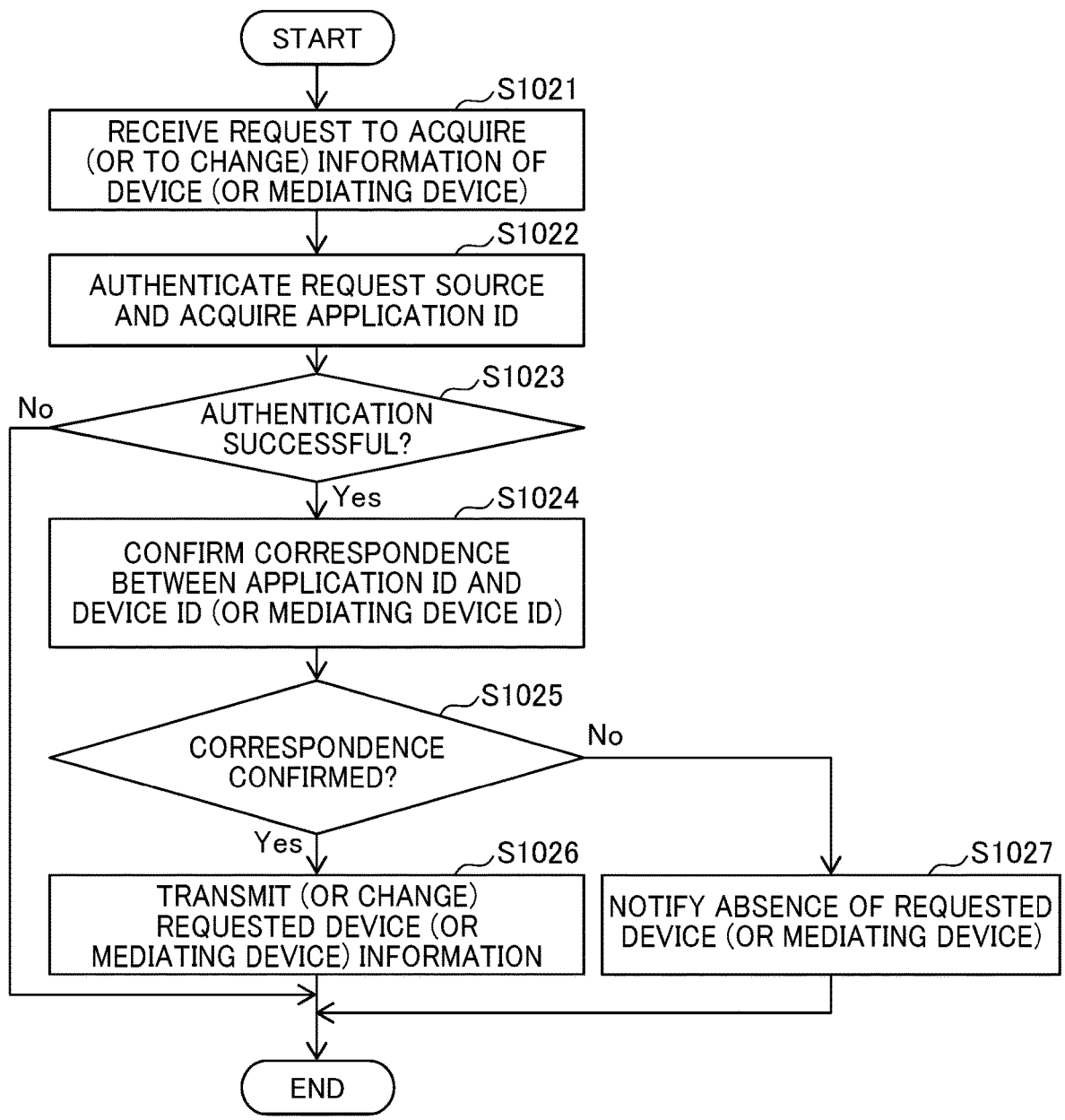

FIG. 10A, FIG. 10B, and FIG. 11 are flowcharts illustrating an example of information acquisition and change processing according to the second embodiment.

FIG. 10A illustrates processing by the device management PF 111 providing information such as a list of the devices 102 corresponding to the device management unit 121, or a list of the mediating devices 101, in response to a request from the device management unit 121.

In step S1011, the request information receiving unit 325 of the device management PF 111 receives a request to acquire the list of the devices 102 (or the mediating devices 101) from the device management unit 121 via the HTTP server 301.

In step S1012, the request information receiving unit 325 of the device management PF 111 authenticates the request source device management unit 121 by using the client authentication unit 302 and acquires the application ID of the device management unit 121. For example, when the client authentication of the device management unit 121 is successful, the request information receiving unit 325 obtains the application ID corresponding to the common name included in the digital certificate based on the application management information 401 as illustrated in FIG. 4A.

In step S1013, the request information receiving unit 325 of the device management PF 111 diverts the processing according to the authentication result of the device management unit 121.

When authentication of the device management unit 121 fails, the request information receiving unit 325 terminates processing. On the other hand, when authentication of the device management unit 121 is successful, processing proceeds to step S1014.

In step S1014, the information transmission unit 326 of the device management PF 111 acquires a list of the devices 102 (or mediating devices 101) corresponding to the application ID acquired in step S1012.

For example, assume that a list of mediating devices 101 is requested from the device management unit 121-1 of the application ID "application X" in the mediating device-application correspondence information 503 illustrated in FIG. 5C. In this case, the information transmission unit 326 acquires the information on the mediating device 101 having the mediating device IDs "mediating device 1" and "mediating device 2" corresponding to the application ID "application X". Likewise, when a list of mediating devices 101 is requested from the device management unit 121-2 of the application ID "application Y", the information transmission unit 326 transmits the information on the mediating device 101 having the mediating device ID "mediating device 3". Also, when a list of the mediating devices 101 is requested from the device management unit 121-3 of the application ID "application Z", the information transmission unit 326 transmits the information on the mediating device 101 having the mediating device ID "mediating device 3".

Meanwhile, in the device-application correspondence information 504 illustrated in FIG. 5D, assume that a list of the devices 102 is requested from the device management unit 121-1 of the application ID "application X". In this case, the information transmission unit 326 acquires information on the device 102 having the device IDs "device 1" and "device 2" corresponding to the application ID "application X". Likewise, when the list of the devices 102 is requested from the device management unit 121-2 of the application ID "application Y", the information transmission unit 326 acquires the information on the device 102 having the device ID "device 3". Further, when a list of the devices 102 is requested from the device management unit 121-3 of the application ID "application Z", the information transmission unit 326 transmits information on the device 102 having the device IDs "device 3" and "device 4".

In step S1015, the information transmission unit 326 of the device management PF 111 transmits the list obtained in step S1014 to the device management unit 121 of the request source.

FIG. 10B illustrates an example of processing when the device management PF 1111 acquires or changes the information on the device 102 (or the mediating device 101) managed by the device management PF 111 in response to a request from the device management unit 121.

In step S1021, the request information receiving unit 325 of the device management PF 111, receive a request to acquire (or to change) information on the device 102 (or the mediating device 101) stored in the device management PF 111, from the device management unit 121 via the HTTP server 301. The request information includes, for example, the device ID of the device 102 subject for the request, or the mediating device ID of the mediating device 101 subject for the request.

In step S1022, the request information receiving unit 325 of the device management PF 111 authenticates the request source device management unit 121 by using the client authentication unit 302 and acquires the application ID of the device management unit 121.

In step S1023, the request information receiving unit 325 of the device management PF 111 bifurcates the processing depending on the authentication result of the device management unit 121.

When authentication of the device management unit 121 fails, the request information receiving unit 325 terminates processing. On the other hand, when the authentication of the device management unit 121 is successful, processing proceeds to step S1024.

In step S1024, the information transmission unit 326 of the device management PF 111 confirms the correspondence between the device ID (or the mediating device ID) included in the request information received in step S1021 and the application ID acquired in step S1022.

For example, in the device-application correspondence information 504 as illustrated in FIG. 5D, the application ID "application X" corresponds to the device IDs "device 1" and "device 2", but the device IDs "device 3", and "device 4" are not supported. Therefore, when the device ID included in the request information is "device 1" and the request source application ID is "application X", the information transmission unit 326 determines that there is a correspondence. On the other hand, when the device ID included in the request information is "device 3" and the request source application ID is "application X", the information transmission unit 326 determines that there is no correspondence.

In addition, in the mediating device-application correspondence information 503 as illustrated in FIG. 5C, the application ID "application X" corresponds to the mediating device IDs "mediating device 1" and "mediating device 2" but does not correspond to the mediating device ID "mediating device 3". Therefore, when the mediating device ID included in the request information is "mediating device 1" and the request source application ID is "application X", the information transmission unit 326 determines that the correspondence exists. On the other hand, when the mediating device ID included in the request information is "mediating device 3" and the application ID of the request source is "application X", the information transmission unit 326 determines that the correspondence does not exist.

In step S1025, the information transmission unit 326 of the device management PF 111 bifurcates the processing depending on whether there is correspondence between the device ID (or the mediating device ID) included in the request information and the acquired application ID.

When the correspondence between the device ID (or mediating device ID) included in the request information and the acquired application ID is confirmed, processing proceeds to step S1026. On the other hand, when the correspondence between the device ID (or mediating device ID) included in the request information and the acquired application ID is not confirmed, the information transmission unit 326 causes processing to proceed to step S1027.

In step S1026, the information transmission unit 326 of the device management PF 111 transmits (or changes) information on the requested device 102 (or the mediating device 101) among the information on the device 102 (or the mediating device 101) stored in the device management PF 111, to the request source.

In step S1027, the information transmission unit 326 of the device management PF 111 notifies the request source device management unit 121 of information indicating that there is no device 102 (or no mediating device 101) corresponding to the request information.

FIG. 11 illustrates an example of processing when the device management PF 111 transfers a command (control information) to the device 102 (or the mediating device 101) in response to a request from the device management unit 121. The command is an example of request information from the device management unit 121.

In step S1101, the request information receiving unit 325 of the device management PF 111 receives the command to acquire (or to change) the information on the device 102 (or the mediating device 101) from the device management unit 121 via the HTTP server 301. This command includes, for example, the device ID of the device 102 (or the mediating device ID of the mediating device 101) that the command is addressed to.

In step S1102, the request information receiving unit 325 of the device management PF 111 authenticates the request source device management unit 121 by using the client authentication unit 302 and acquires the application ID of the device management unit 121.

In step S1103, the request information receiving unit 325 of the device management PF 111 diverts the processing according to the authentication result of the device management unit 121.

When authentication of the device management unit 121 fails, the request information receiving unit 325 terminates processing. On the other hand, when the authentication of the device management unit 121 is successful, processing proceeds to step S1104.

In step S1104, the information transmission unit 326 of the device management PF 111 confirms the correspondence between the device ID (or the mediating device III) included in the command received in step S1101 and the application ID acquired in step S1102. This processing is the same as step S1024 in FIG. 10B.

In step S1105, the information transmission unit 326 of the device management PF 111 bifurcates the processing depending on whether the correspondence between the device ID (or the mediating device ID) included in the request information and the acquired application ID exists.

When the correspondence between the device ID (or the mediating device Ill) included in the request information and the acquired application ID exists, processing proceeds to step S1106. On the other hand, when the correspondence between the device ID (or the mediating device ID) included in the request information and the acquired application ID does not exist, the information transmission unit 326 causes processing to proceed to step S1107.

In step S1106, the information transmission unit 326 of the device management PF 111 uses the WebSocket 311 and transfers part or all the command received via the request information receiving unit 325 to the mediating device 101 that collects the requested information on the device 102, or the mediating device 101.

In step S1107, the information transmission unit 326 of the device management PF 111 notifies the request source device management unit 121 that there is no device 102 (or no mediating device 101) corresponding to the command.

Through the above-described processing, the device management PF 111 can acquire and change only the information on the device 102 corresponding to the device management unit 121 or the mediating device 101, in response to the request from the device management unit 121.

Third Embodiment

In the third embodiment, an example of registration processing for registering the mediating device 101, the device management unit 121, the device 102, and the like in the device management system 100, is described.

Figure 12A:
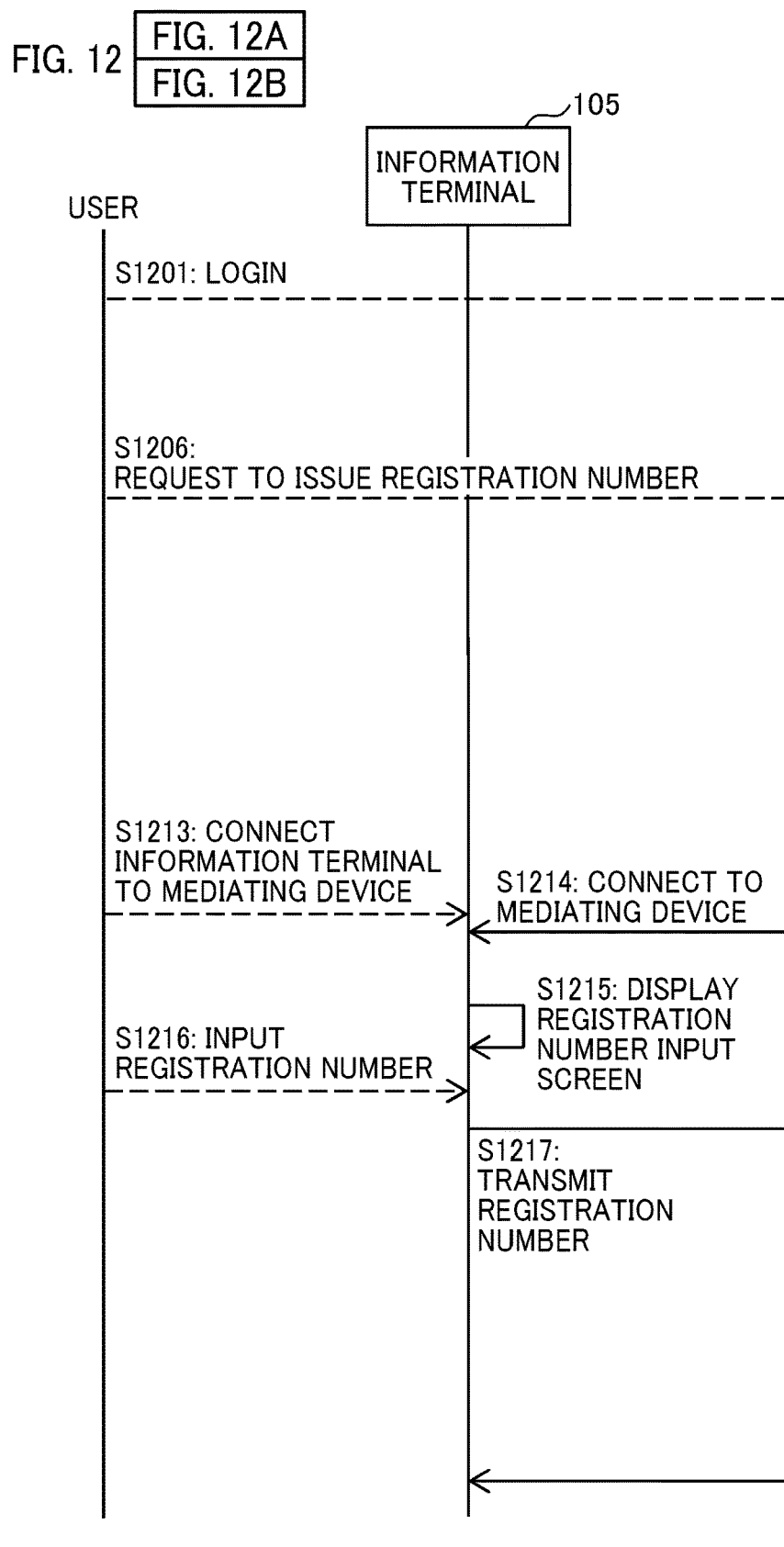
FIG. 12A and FIG. 12B are sequence diagrams illustrating registration processing of a mediating device according to a third embodiment of the present disclosure.
Figure 12B:
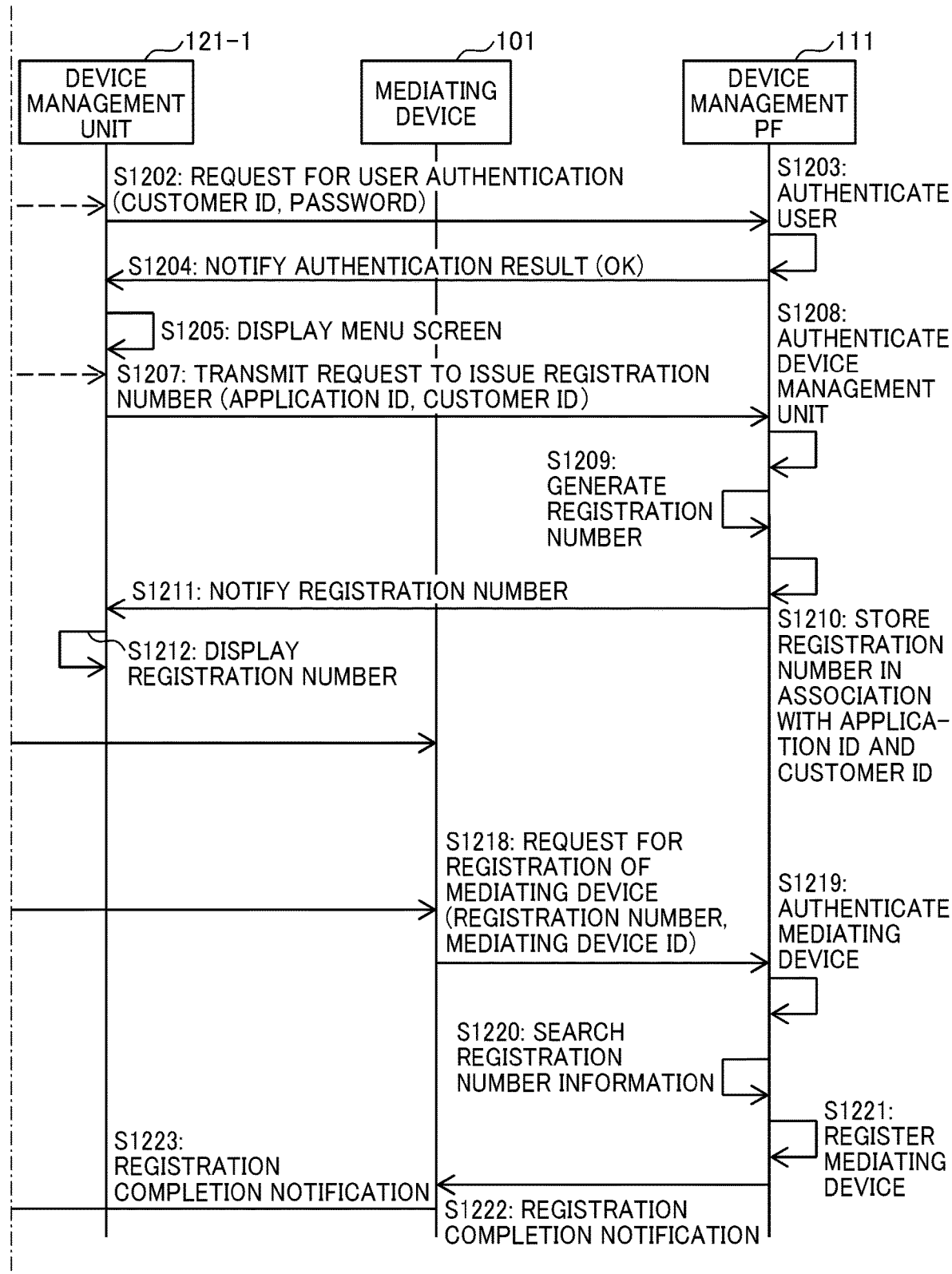

FIG. 12A and FIG. 12B are sequence diagrams illustrating registration processing of a mediating device according to a third embodiment of the present disclosure. An example of registration processing when the user registers the mediating device 101 in the device management system 100 is described.

In step S1201, the user performs a login operation to the device management unit 121-1 of the device management apparatus 120-1. For example, the device management unit 121-1 causes the display unit 207 of the device management apparatus 120-1 to display a login screen 1410 as illustrated in FIG. 14A. The user inputs the customer ID in the customer ID input field 1411 and the password in the password input field 1412 on the login screen 1410 and selects the login button 1413 to login to the device management unit 121-1.

In step S1202, the device management unit 121-1 transmits a user authentication request including the input customer ID and password to the device management PF 111.

In step S1203, the device management PF 111 authenticates the user based on the customer management information 402 and notifies the device management unit 121-1 of the authentication result in step S1204.

Upon successful authentication of the user, in step S1205, the device management unit 121-1 displays, for example, a menu screen 1420 as illustrated in FIG. 14B on the display unit 207 of the device management apparatus 120.

In step S1206, the user performs a registration number issuing operation. For example, the user selects the issue registration number button 1421 from the plurality of operation buttons displayed on the menu screen 1420.

In step S1207, the device management unit 121-1 transmits to the device management PF 111 a request to issue a registration number including the application ID of the device management unit 121-1 and the customer ID input in step S1201.

In step S1208, the client authentication unit 302 authenticates the device management unit 121-1 in the device management PF 111. When authentication is successful, the device management PF 111 executes the processing in step S1209 and subsequent steps.

In step S1209, the registration management unit 327 of the device management PF 111 generates the registration number in response to the request to issue the registration number. The registration number is unique information such as a serial number used for registration of the mediating device 101.

In step S1210, the registration management unit 327 of the device management PF 111 stores the application ID and the customer ID included in the request to issue the registration number in association with the generated registration number. For example, the registration management unit 327 generates the registration number information 1301 as illustrated in FIG. 13A and stores the registration number information 1301 in the storage unit 312.

In step S1211, the registration management unit 327 of the device management PF 111 notifies the requested device management unit 121-1 of the generated registration number.

In step S1212, the device management unit 121-1 of the device management apparatus 120-1 displays the registration number notified from the device management PF 111 on the registration number display screen 1430 as illustrated in FIG. 14C, for example.

Through the above-described processing, the user can acquire the registration number for registering the mediating device 101 in the device management system 100. Note that the user can connect to the device management unit 121-1 and perform the same processing by using a web browser or the like operating on the information terminal 105.

In step S1213, the user connects the information terminal 105 to the mediating device 101 to register the mediating device 101. For example, the user connects the information terminal 105 to the network I/F or the like provided for management of the mediating device 101 by using a LAN cable or the like. Alternatively, the user may connect the information terminal 105 to the mediating device 101 via the network 140 (or the local network 104).

When the information terminal 105 is connected to the mediating device 101 in step S1214, a registration number input screen is displayed in the web browser or the like of the information terminal 105 in step S1215.

In step S1216, when the user inputs the registration number displayed in step S1209 to the registration number input screen, the registration number is input to the mediating device 101 in step S1217.

When the registration number is input to the mediating device 101, the setting control unit 703 of the mediating device 101 transmits a registration request including the registration number and the mediating device ID of the mediating device 101 to the device management PF 111 (step S1218). The mediating device ID may be transmitted as the common name included in the digital certificate used for the client authentication, for example.

In step S1219, the client authentication unit 302 of the device management PF 111 authenticates the mediating device 101. When authentication is successful, the device management PF 111 executes the processing in step S1220 and subsequent steps.

In step S1220, the registration management unit 327 of the device management PF 111 searches for the registration number information 1301 which includes the registration number included in the registration request of the mediating device, from the registration number information 1301 stored in the storage unit 312. As a result, the registration number information 1301 stored in the storage unit 312 in step S1210 is retrieved.

In step S1221, the registration management unit 327 of the device management PF 111 registers the mediating device ID included in the registration request of the mediating device by using the retrieved registration number information 1301.

For example, by registering the mediating device ID included in the registration request of the mediating device in the mediating device ID column of the registration number information 1301 illustrated in FIG. 13A, mediating device-application correspondence information 503 is completed as illustrated in FIG. 13B.

Preferably, at this time, a new record as illustrated in FIG. 13C is added to the mediating device management information managed by the mediating device information management unit 306.

In step S1222, the registration management unit 327 of the device management PF 111 transmits a registration completion notification to the mediating device 101 to indicate that the registration of the mediating device 101 is completed.

When the mediating device cannot hold the mediating device ID (digital certificate including the mediating device ID, etc.) in advance, the device management PF 111 may issue the mediating device ID after step S1220. In this case, the mediating device ID is included in the registration completion notification issued in step S1222, and the mediating device 101 which received the notification stores the issued mediating device ID and uses the mediating device ID in subsequent processing.

Further, when including the mediating device ID in the digital certificate, the device management PF 111 may issue a digital certificate (individual certificate) including the mediating device ID. In that case, the individual certificate is included in the registration completion notification transmitted in step S1222, and the mediating device 101 which received the registration completion notification stores the individual certificate and uses the individual certificate in subsequent processing.

In this case, the mediating device 101 transmits a digital certificate (common certificate) not including the mediating device ID in the registration request transmitted in step S1218, and the device management PF 111 verifies that the common certificate is correct in step S1219 and permits registration processing of the mediating device 101. Preferably, the device management PF 111 permits the authentication by the common certificate only to the registration processing of the mediating device 101 and does not permit the authentication by the common certificate in the subsequent processing.

In step S1223, the mediating device 101 transfers the received registration completion notification to the information terminal 105.

Through the above-described processing, the user registers the mediating device 101 in the mediating device-application correspondence information 503 illustrated in FIG. 13B and associates the mediating device ID with the application ID (mediating device 101 and device management unit 121). At this time, for example, as illustrated in the mediating device management information 403 in FIG. 13C, the mediating device ID and the customer ID (the mediating device 101 and the account) are associated with each other.

Figure 15:
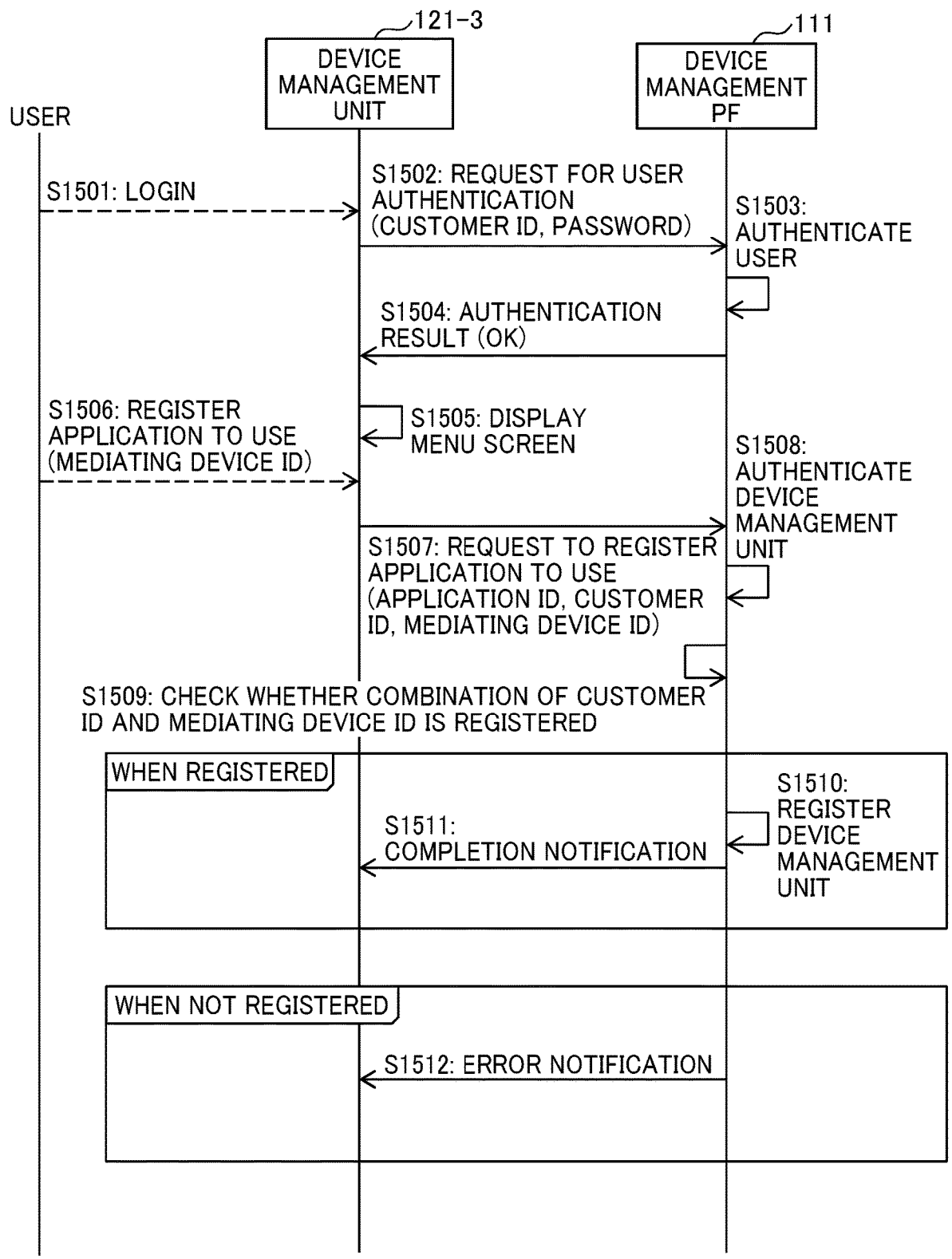
FIG. 15 is a sequence diagram illustrating registration processing of a device management unit according to the third embodiment of the present disclosure.

FIG. 15 is a sequence diagram illustrating the registration processing of the device management unit according to the third embodiment of the present disclosure. An example of processing when the user registers the device management unit 121-3 in the device management system 100 is described.

In step S1501, the user logs in to the device management unit 121-3 of the device management apparatus 120-3. For example, the user inputs the customer ID in the customer ID input field 1411 and the password in the password input field 1412 on the login screen 1410 as illustrated in FIG. 14A and selects the login button 1413.

In step S1502, the device management unit 121-3 transmits a user authentication request including the input customer ID and password to the device management PF 111.

In step S1503, the device management PF 111 authenticates the user based on the customer management information 402 and notifies the device management unit 121-3 of the authentication result in step S1504.

Upon successful authentication of the user in step S1505, the device management unit 121-3 causes the display unit 207 of the device management apparatus 120-3 to display, for example, the menu screen 1420 as illustrated in FIG. 14B.

In step S1506, the user registers the application to use. For example, the user selects a register application to use button 1422 from a plurality of operation buttons displayed on the menu screen 1420, and inputs the mediating device ID.

As an example of a method of inputting the mediating device ID, the device management unit 121-3 may obtain the list of the mediating device 101 associated with the customer ID of the user from the device management PF 111, and may display the mediating device selection screen 1440 as illustrated in FIG. 14D In this case, the user selects the mediating device selection button 1441 and the mediating device ID of the selected mediating device 101 is input.

In step S1507, the device management unit 121-3 transmits the application ID of the device management unit 121-3, the customer ID input in step S1501, and the application use registration request of the application including the mediating device ID input in step S1506, to the device management PF 111.

In step S1508, the device management PF 111 authenticates the device management unit 121-3 in the client authentication unit 302, and when the authentication is successful, executes the processing in step S1506 and the subsequent steps.

In step S1509, the registration management unit 327 of the device management PF 111 checks whether combination of the customer ID and the mediating device ID included in the application use registration request is registered in the mediating device management information 403 as illustrated in FIG. 4C.

When the combination of the customer ID and the mediating device ID included in the application use registration request is registered in the mediating device management information 403, the registration management unit 327 executes step S1510 and step S1511. On the other hand, when the combination of the customer ID and the mediating device ID included in the application use registration request is not registered in the mediating device management information 403, the registration management unit 327 executes step S1512.

In step S1510, the registration management unit 327 of the device management PF 111 registers the device management unit 121-3 in the mediating device-application correspondence information 503 as illustrated in FIG. 13D, for example. In the example of FIG. 13D, the application ID "application Z" of the device management unit 121-3 is stored in association with the customer ID "customer B" and the mediating device ID "mediating device 3".

In step S1511, the registration management unit 327 of the device management PF 111 transmits the device management unit 121-3 of a completion notification indicating that the application use registration of the device management unit 121-3 has been completed.

On the other hand, when proceeding to step S1512, the registration management unit 327 of the device management PF 111 notifies the device management unit 121-3 of an error indicating that the application use registration of the device management unit 121-3 cannot be performed.

Through the above-described processing, the user can register the device management unit 121-3 in the mediating device-application correspondence information 503 as illustrated in FIG. 13D.

Preferably, whether or not to register the device management unit 121 is configurable.

FIG. 16A illustrates another example of the mediating device-application correspondence information 503. The mediating device-application correspondence information 503 illustrated in FIG. 16A includes additional registration information in addition to the information included in the mediating device-application correspondence information 503 illustrated in FIG. 5.

In this example, the user configures the settings to allow or not allow additional registration of the mediating device as illustrated as an example in FIG. 12A and FIG. 12B. In addition, the information on whether the additional registration is possible or not is also reflected in the mediating device management information 403 as illustrated as an example in FIG. 16B when registering the mediating device.

When the setting of additional registration of the mediating device ID "mediating device 3" is not allowed, the registration management unit 327 rejects the application use registration request of the device management unit including the mediating device ID "mediation device 3", in the registration processing of the device management unit illustrated in FIG. 15.

Figure 17A:
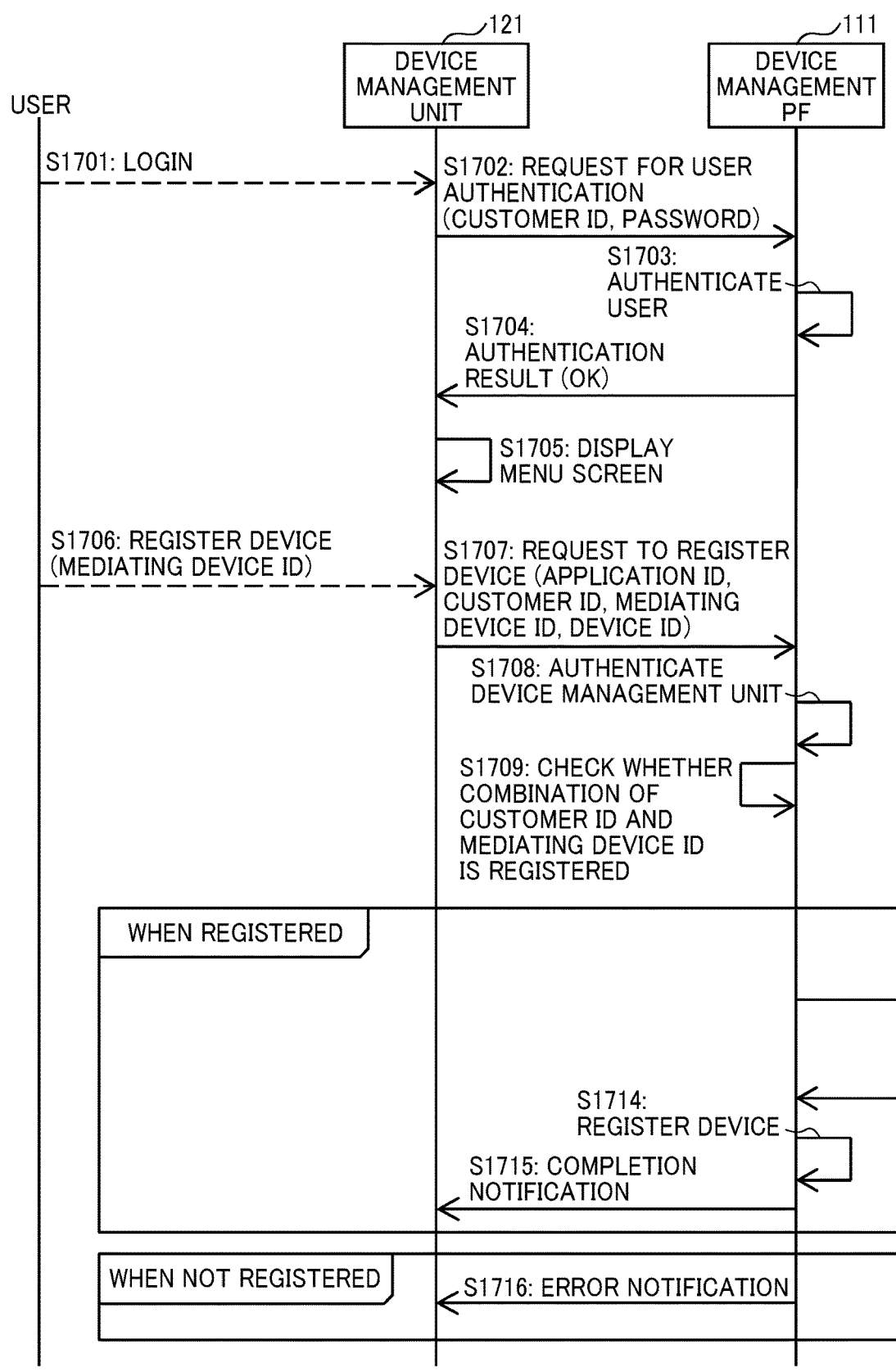
FIG. 17A and FIG. 17B are sequence diagrams illustrating a device registration process according to the third embodiment of the present disclosure.
Figure 17B:
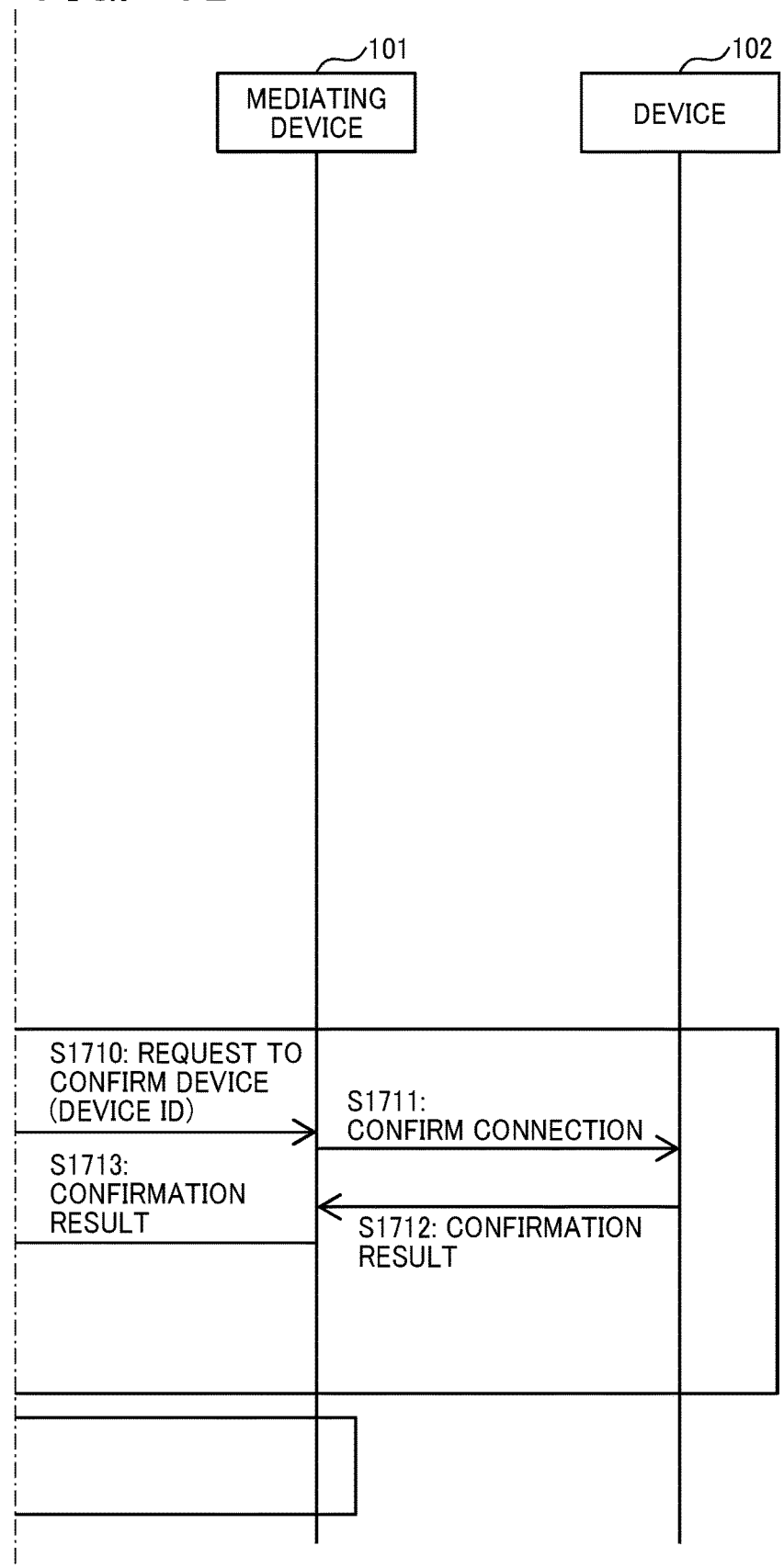

FIG. 17A and FIG. 17B are sequence diagrams illustrating a device registration process according to the third embodiment of the present disclosure. An example of processing when the user registers the device 102 to be managed in the device management system 100 is described.

In step S1701, the user logs in to the device management unit 121 of the device management apparatus 120. For example, the user inputs the customer ID in the customer ID input field 1411 and the password in the password input field 1412 on the login screen 1410 as illustrated in FIG. 14A and selects the login button 1413.

In step S1702, the device management unit 121 transmits a user authentication request including the input customer ID and the password to the device management PF 111.

In step S1703, the device management PF 111 authenticates the user based on the customer management information 402, and in step S1704, notifies the device management unit 121 of the authentication result.

Upon successful authentication of the user, in step S1705, the device management unit 121 causes the display unit 207 of the device management apparatus 120 to display the menu screen 1420 as illustrated as an example in FIG. 14B.

In step S1706, the user performs registration operation of the device. For example, the user selects a register device button 1423 from the plurality of operation buttons displayed on the menu screen 1420, and inputs the mediating device ID and the device ID.

As another example, the device management unit 121 acquires the list of the mediating devices 101 associated with the customer ID of the user from the device management PF 111 and displays the mediating device selection screen 1440 as illustrated in FIG. 14D. In this case, the user can input the mediating device ID by selecting the mediating device selection button 1441.

Likewise, the device management unit 121 may acquire from the device management PF 111 the list of the devices 102 that has been detected by the selected mediating device 101 and may display the device selection screen 1450 as illustrated in FIG. 14E. In this case, the user can input the device ID by selecting the device selection button 1451.

In step S1707, the device management unit 121 transmits the device registration request including the application ID of the device management unit 121, the customer ID input in step S1701, and the mediating device ID and the device ID input in step S1706 to the device management PF 111.

In step S1708, the device management PF 111 authenticates the device management unit 121 with the client authentication unit 302. When authentication is successful, the device management PF 111 executes the processing in step S1709 and the subsequent steps.

In step S1709, the registration management unit 327 of the device management PF 111 checks whether the combination of the application ID, the customer ID, and the mediating device ID included in the device registration request is registered in, for example, the mediating device-application correspondence information 503 as illustrated in FIG. 5C.

When the combination of the application ID, the customer ID, and the mediating device ID included in the device registration request is registered in the mediating device-application correspondence information 503, the registration management unit 327 executes step S1710 through step S1715. On the other hand, when the combination of the application ID, the customer ID, and the mediating device ID included in the device registration request is not registered in the mediating device-application correspondence information 503, the registration management unit 327 executes step S1716.

In step S1710, the registration management unit 327 of the device management PF 111 transmits a device confirmation request including the device ID of the device 102 to be registered to the mediating device 101 corresponding to the mediating device ID included in the device registration request.

In step S1711 and step S1712, the mediating device 101 confirms the connection of the device 102 corresponding to the device ID included in the device confirmation request. For example, the mediating device 101 transmits a message confirming connection to the device 102, determines that the device 102 is connected if there is a response, and determines that the device 102 is not connected if there is no response.

In step S1713, the mediating device 101 transmits the confirmation result of the device 102 to the device management PF 111. Here, it is assumed that the mediating device 101 transmits the confirmation result to the device management PF 111, indicating that the device 102 is connected.

In step S1714, the registration management unit 327 of the device management PF 111 registers the device 102, for example, in the device-application correspondence information 504 as illustrated in FIG. 5D, associating with the application ID of the device management unit 121.

In step S1715, the registration management unit 327 of the device management PF 111 transmits the completion notification indicating that registration of the device 102 is completed to the device management unit 121.

On the other hand, when proceeding to step S1716, the registration management unit 327 of the device management PF 111 notifies the device management unit 121 of the error indicating that the device 102 cannot be registered.

Through the above-described processing, the user can register the device-application correspondence information 504 in the device management PF 111 as illustrated as an example in FIG. 5D.

Fourth Embodiment

In the fourth embodiment, processing related to the setting management unit 112 of the management server 110 and display processing of terms of use will be described as examples of other processing.

In the third embodiment, a method of registering the mediating device 101, the device management unit 121, the device 102, and the like in the device management PF 111 using the device management unit 121 of the device management apparatus 120 is described.

Here, an example of processing by the setting management unit 112 of the management server 110 to register the mediating device 101, the device management unit 121, the device 102, and the like in the device management PF 111 is described.

Figure 18:
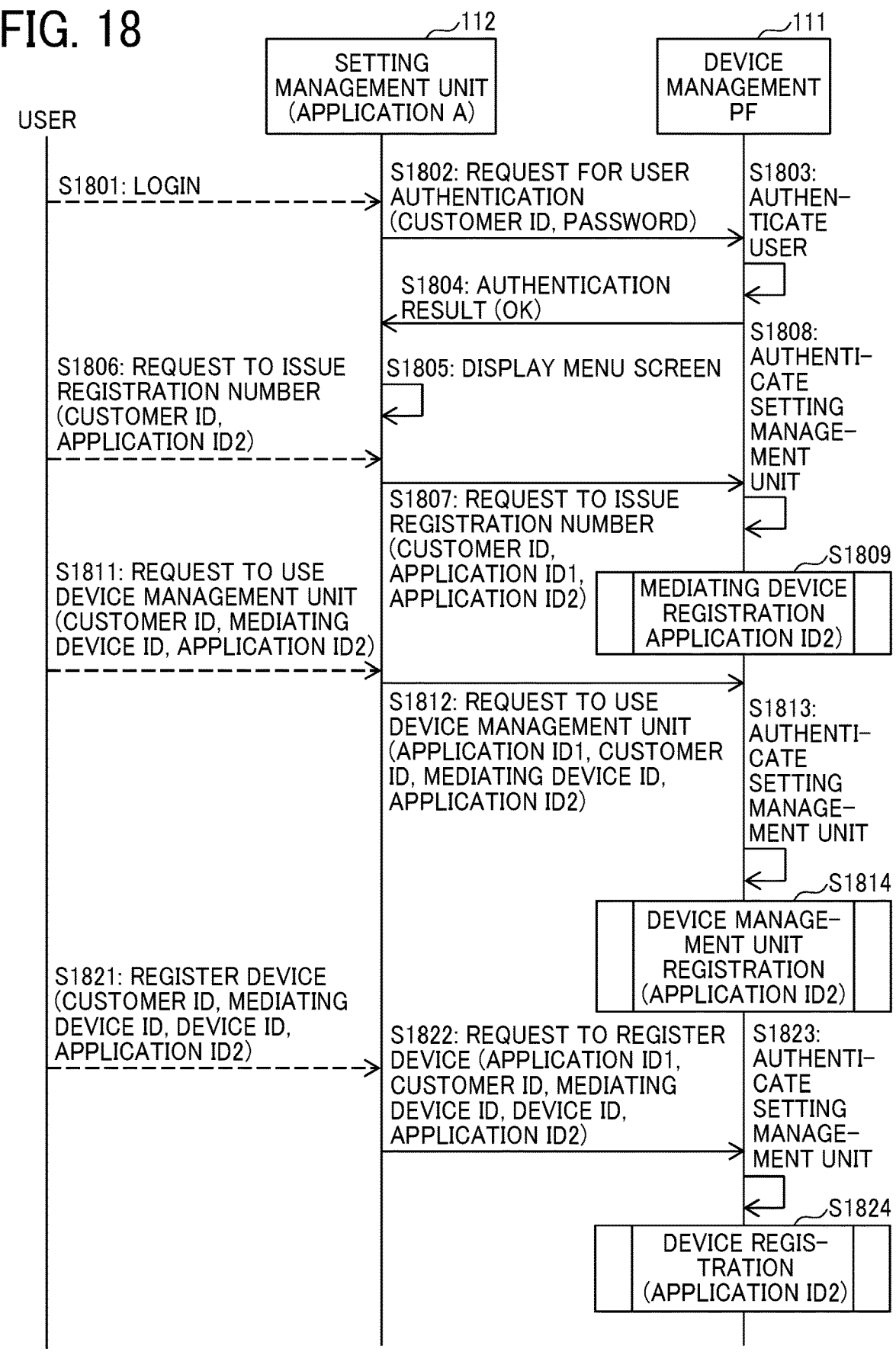
FIG. 18 is a sequence diagram illustrating processing executed by a setting management unit according to a fourth embodiment of the present disclosure.

FIG. 18 is a sequence diagram illustrating processing of the setting management unit according to the fourth embodiment of the present disclosure.

In step S1801, the user logs in to the setting management unit 112 of the management server 110. For example, when the user performs the registration processing using the setting management unit 112, the user inputs the customer ID and the password on the login screen 1410 as illustrated in FIG. 14A and selects the login button 1413.

When a user such as an administrator of the device management system 100 registers the device management unit 121-1, the user logs in to the setting management unit 112 using the ID and the password for the administrator. Here, an example, the following explanation is given assuming that the user is the administrator or the like of the device management system 100.

In step S1802, the setting management unit 112 transmits the user authentication request including the input customer ID and password to the device management PF 111.

In step S1803, the device management PF 111 authenticates the user based on the customer management information 402, and in step S1804, notifies the setting management unit 112 of the authentication result.

Upon successful authentication of the user, in step S1805, the setting management unit 112 of the management server 110 displays a menu screen 1420 such as that illustrated in FIG. 14B on the display unit 207 of the management server 110.

In step S1806, the user performs an operation to issue the registration number. For example, the user inputs the customer ID of the account to be registered, the application ID (hereinafter referred to as application ID 2) of the device management unit 121 to be registered and issues the registration number.

As another example, the user selects a select application button 1424 from the menu screen 1420 as illustrated in FIG. 14B. As a result, the setting management unit 112 displays an application selection screen 1460 as illustrated as an example in FIG. 14F. The user may input the application ID 2 by selecting the application (device management unit 121) to be registered from the selection screen 1460 of this application.

In step S1807, the setting management unit 112 of the management server 110 issues the registration number request including the customer ID, the application ID 2, and the application ID of the setting management unit 112 (hereinafter referred to as an application ID 1) input in step S1806 and transmits the request to the device management PF 111.

In step S1808, the registration management unit 327 of the device management PF 111 performs authentication of the setting management unit 112. At this time, in addition to the usual client authentication processing, the registration management unit 327 confirms whether the application ID 1 included in the registration number request is the application ID "application A" set in advance in the setting management unit 112.

When the client authentication of the setting management unit 112 is successful and the application ID 1 is the application ID "application A" of the setting management unit 112 set in advance, the registration management unit 327 executes step S1809.

In step S1809, the registration management unit 327 of the device management PF 111 assumes that the request to issue the registration number is received from the device management unit 121 corresponding to the application ID 2, and registers the mediating device as illustrated as an example in FIG. 12A and FIG. 12B.

As another example, in step S1811, the user registers the device management unit for use. For example, the user inputs the customer ID, the mediating device ID, and the application ID 2 to be registered, and performs the usage registration operation of the device management unit.

As described above, the mediating device ID may be input using the mediating device selection screen 1440 as illustrated as an example in FIG. 14D. Further, the application ID 2 may be input using the application selection screen 1460 as illustrated as an example in FIG. 14F.

In step S1812, the setting management unit 112 of the management server 110 transmits the usage registration request of the device management unit including the customer ID, the mediating device ID, the application ID 2, and the application ID 1 of the setting management unit 112 input in step S1811 to the device management PF 111.

In step S1813, the registration management unit 327 of the device management PF 111 performs authentication of the setting management unit 112. At this time, in addition to the usual client authentication processing, the registration management unit 327 confirms whether the application ID 1 included in the registration number request is the application ID "application A" set in advance in the setting management unit 112.

When the client authentication of the setting management unit 112 is successful and the application ID 1 is the application ID "application A" of the setting management unit 112 set in advance, the registration management unit 327 executes step S1814.

In step S1814, the registration management unit 327 of the device management PF 111 assumes that the usage management request of the device management unit is received from the device management unit 121 corresponding to the application ID 2 and executes the device management unit registration processing as illustrated as an example in FIG. 15.

Furthermore, as another example, in step S1821, the user registers the device. For example, the user inputs the customer ID, the mediating device ID, the device ID, and the application ID 2 to be registered, and performs a registration operation of the device.

As described above, the mediating device ID may be input using the mediating device selection screen 1440 as illustrated as an example in FIG. 14D. Further, the application ID 2 may be input using the application selection screen 1460 as illustrated as an example in FIG. 14F. Further, the device ID may be input using the device selection screen 1450 as illustrated as an example in FIG. 14E.

In step S1822, the setting management unit 112 of the management server 110 transmits the device registration request including the customer ID, the mediating device ID, the device ID, the application ID 2, and the application ID 1 of the setting management unit 112 to the device management PF 111.

In step S1823, the registration management unit 327 of the device management PF 111 performs authentication of the setting management unit 112. At this time, in addition to the usual client authentication processing, the registration management unit 327 confirms whether the application ID 1 included in the registration number request is the application ID "application A" set in advance in the setting management unit 112.

When the client authentication of the setting management unit 112 is successful and the application ID 1 is the application ID "application A" of the setting management unit 112 set in advance, the registration management unit 327 executes step S1824.

After proceeding to step S1824, the registration management unit 327 of the device management PF 111 assumes that the device registration request is received from the device management unit 121 corresponding to the application ID 2 and executes the registration processing of the device as illustrated in FIG. 17A and FIG. 17B.

In this way, the user can register each account using the device management system 100, and process necessary registrations corresponding to each device management unit 121 using the setting management unit 112 of the management server 110. Note that the user may access the setting management unit 112 of the management server 110 using the web browser or the like operating on the information terminal 105 and executes various registration processing such as that illustrated in FIG. 18, using the setting management unit 112.

In this example, the device management PF 111 recognizes the application ID "application A" assigned to the setting management unit 112 as a special ID and permits the processing for the application ID 2, so that shared processing is not necessary for each application. As an application that implements such shared processing, it is not necessary to limit to only one "application A". A flag for distinguishing a privileged application may be added to the application management information 401, and processing equivalent to that of the setting management unit 112 may be permitted for the privileged application.

Figure 19:
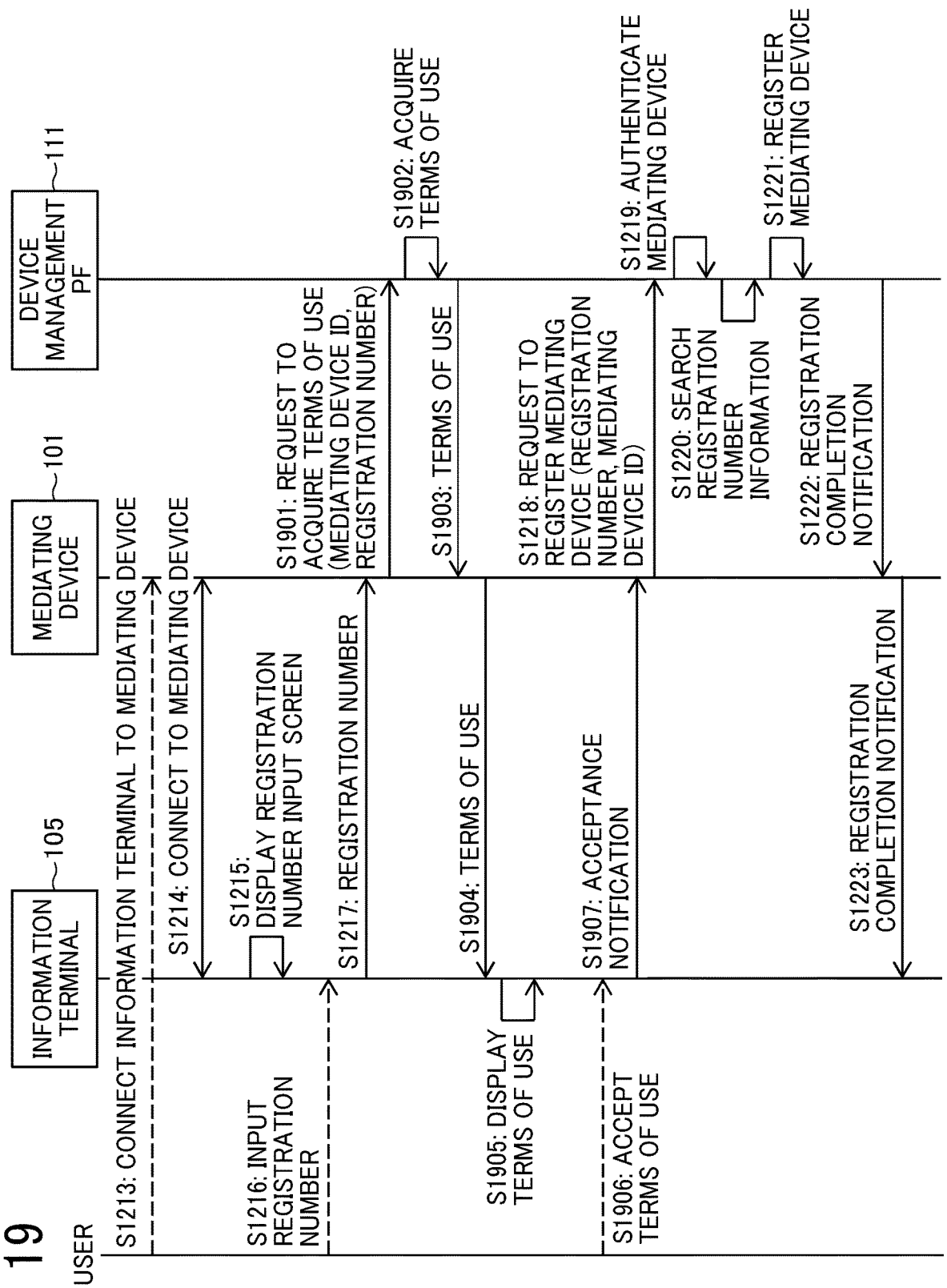
FIG. 19 is a sequence diagram illustrating display of terms of use according to the fourth embodiment of the present disclosure.

FIG. 19 is a sequence diagram illustrating the display processing of the terms of use according to the fourth embodiment of the present disclosure. This processing describes an example of displaying the terms of use in the registration processing of the mediating device illustrated as an example in steps S1213 to S1223 of FIG. 12A and FIG. 12B. Since the processing in step S1213 to step S1217 and step S1218 to step S1223 in FIG. 19 are the same as the processing in step S1213 to step S1223 illustrated in FIG. 12A and FIG. 12B, the description below is focusing on the differences from the processing in FIG. 12A and FIG. 12B.

In step S1901, when accepting input of the registration number from the information terminal 105, the mediating device 101 transmits an acquisition request for the terms of use including the mediating device ID and the registration number to the device management PF 111.

In step S1902, the registration management unit 327 of the device management PF 111 searches for registration number information including a registration number included in the acquisition request for the terms of use from the registration number information 1301, and specifies the application ID. The registration management unit 327 of the device management PF 111 identifies the application management information 401 from the specified application ID, acquire the terms of use from the terms of use URL, and in step S1903, transmits the terms of use to the mediating device 101.

In step S1904 and step S1905, the mediating device 101 causes the display unit 207 or the like of the information terminal 105 to display the terms of use acquired from the device management PF 111.

In step S1906, when the user indicates acceptance of the terms of use by the operation of the information terminal in step S1907, a notification indicating acceptance of the terms of use is transmitted to the mediating device 101. As a result, the mediating device 101 executes registration processing of the mediating device after step S1218.

It is preferable that the collection and transmission of the information on the device 102 by the mediating device 101 is executed based on the terms of the contract (terms of use and the like) with the customer. Through the above-described processing, when registering the mediating device 101, the device management system 100 can acquire consent of the customer based on the latest terms of use. Here, an example of confirming the terms of use at the time of registering the mediating device is explained, but the terms of use may be confirmed at the time of issue of the registration number, registration of the device, and the like.

Fifth Embodiment

Figure 20:
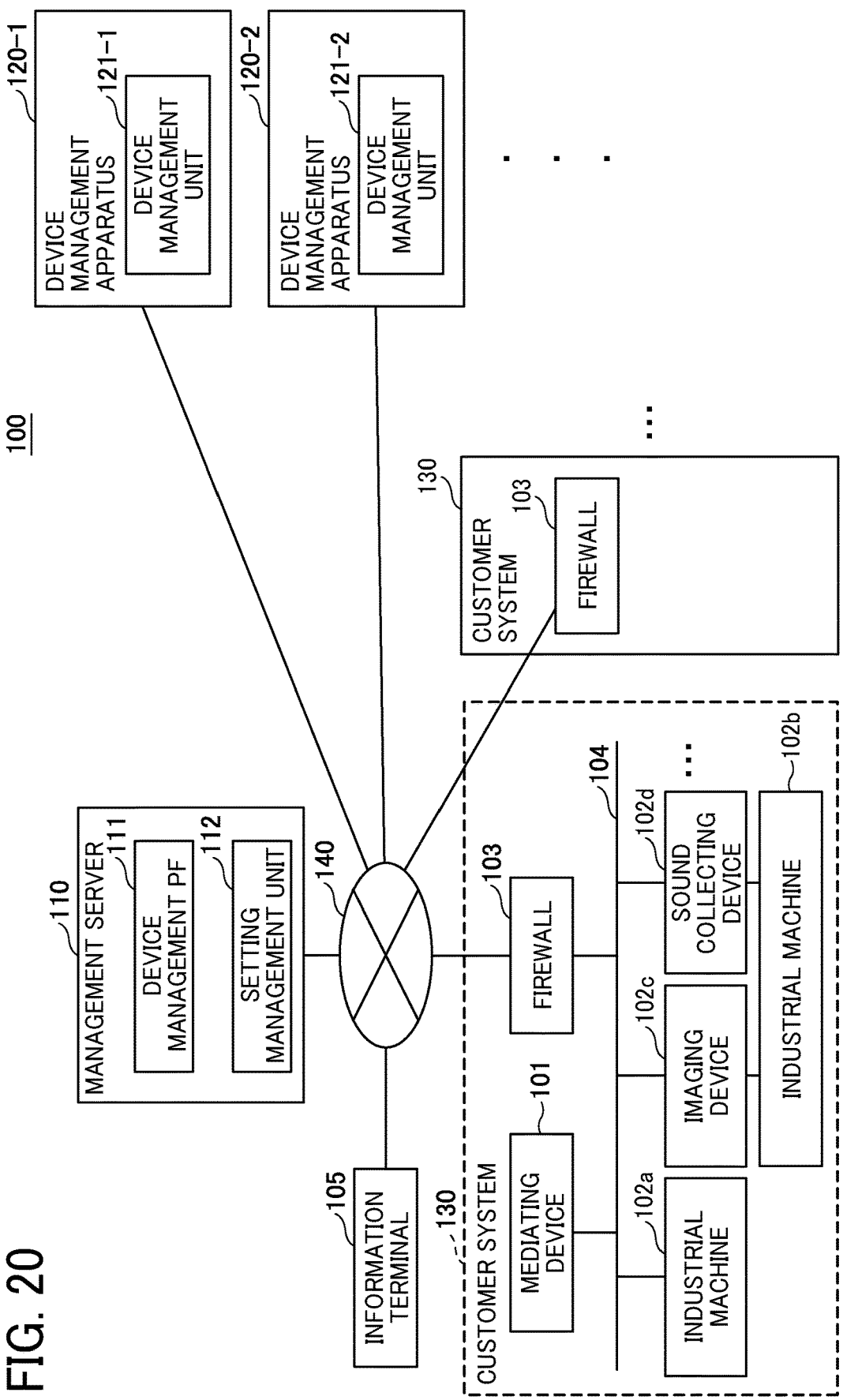
FIG. 20 is a block diagram illustrating a configuration of a device management system of an industrial machine according to a fifth embodiment of the present disclosure.

The present disclosure can also be applied to a management system of industrial machine. FIG. 20 is a block diagram illustrating the configuration of the management system of an industrial machine according to a fifth embodiment of the present disclosure. Since the basic configuration of the fifth embodiment is the same as the configuration example of the device management system 100 illustrated in FIG. 1, the differences between this embodiment and the device management system 100 illustrated in FIG. 1 are mainly described here.

As illustrated in FIG. 20, in the management system 100 of the industrial machine, a plurality of industrial machines 102a, 102b, sensors such as an imaging device 102c, a sound collecting device 102d, etc., and one or more of the mediating device 101 are connected to the local network 104 of the customer system 130. The sensors such as the imaging device 102c and the sound collecting device 102d are, for example, attached to the industrial machine 102b itself, or around the industrial machine 102b, to acquire information on the industrial machine 102b.

The management system 100 of the industrial machine is an example of the device management system. The industrial machines 102a and 102b, the imaging device 102 c, the sound collecting device 102d, and the like are examples of the device 102 to be managed.

The mediating device 101 is capable of communicating with the management server 110 via the firewall 103 and the network 140, collects information on the industrial machines 102a and 102b to be managed, the imaging device 102c, the sound collecting device 102d, etc., and notifies the management server 110 thereof. Further, the mediating device 101 transmits the control information notified from the management server 110 to the industrial machines 102a, 102b, the imaging device 102c, the sound collecting device 102d, and the like.

Here, it is also conceivable that a plurality of customer systems 130, firewalls 103, and the like are installed. Further, it is also conceivable that a plurality of mediating devices 101 are installed in one customer system 130.

Examples of the devices to be managed by the management system 100 of the industrial machine include an image forming device, a network home appliance, a vending machine, a medical device, a 3D printer, a power supply device, an air conditioning system, a metering system for gas, water, electricity, etc., which are equipped with a communication function. Examples of the medical device include a fundus examination device, an X-ray examination device, a blood pressure monitor, a body fat meter, a visual acuity meter, a pacemaker, and the like. When medical devices are to be managed, the mediating device 101 collects information such as identification information on the device 102 to be managed, the operation status of the device 102 including the presence or absence of an abnormal operation, a measurement result by the device 102, and a counter or a log indicating the usage amount of the device 102, and transmits the collected information to the management server 110.

The 3D printers include fused deposition modeling (FDM), material jetting, binder jetting, powder sintered laminated shaping (SLS), stereolithography (SLA), and the like as shaping methods. When the 3D printer is to be managed, the mediating device 101 collects information such as the identification information on the device 102 to be managed, the presence or absence of an abnormal operation of the device 102, the state of the consumables accumulated in the device 102 and transmits the collected information to the management server 110.

In the management system of the industrial machine, the manufacturer of the industrial machine may be treated as the customer instead of treating the user (end user) of the device 102 as the customer. In this case, instead of limiting the transmission of management information from the device management apparatus 120 to each user, the device management apparatus 120 may be selected according to the manufacturer of the device 102. In this way, the manufacturer's operator can use the application in the device management apparatus 120 to monitor the state of the device 102 provided by the manufacturer or charge the user (the customer) according to the usage amount of the device 102.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. An information processing apparatus, comprising:
a memory to store one or more programs; and
a processor configured to execute the one or more programs to:
communicate via a network with one or more device managers to manage devices and one or more mediating devices to collect device information on the devices from the devices;
manage correspondence between the one or more mediating devices and the one or more device managers;
receive, from the one or more mediating devices, device identification information to identify the mediating device and the device information on the device or collected by the one or more mediating devices;
identify a corresponding device manager from among one or more device managers based on the correspondence and the device identification information received from the one or more mediating devices; and
transmit the device identification information to the corresponding device manager,
wherein in response to a registration number issue request including manager identification information to identify the device manager from the device manager, the processor:
generates the registration number,
manages the registration number in association with the manager identification information,
transmits the registration number to the device manager, and
in response to a mediating device registration request including the registration number and the device identification information on the one or more mediating devices from the one or more mediating devices, manages the registration number and the device identification information included in the mediating device registration request in association with the manager identification information stored in association with the registration number included in the mediating device registration request, and
identify the corresponding device manager based on a correspondence between the device identification information and the manager identification information received from the one or more mediating devices.

2. The information processing apparatus of claim 1, wherein the processor manages first correspondence information that stores correspondence between account information for identifying an account and the device manager and second correspondence information that stores the correspondence between the account information and the one or more mediating devices, specifies the account information corresponding to the one or more mediating devices that acquired the device identification information based on the second correspondence information, and determines the device manager corresponding to the specified account information as the device manager corresponding to the device identification information based on the first correspondence information.

3. The information processing apparatus of claim 1, wherein the processor manages third correspondence information that stores the correspondence between the device manager and the one or more mediating devices, and determines the device manager corresponding to the one or more mediating devices that acquired the device identification information as the device manager corresponding to the device identification information based on the third correspondence information.

4. The information processing apparatus of claim 1, wherein the processor manages fourth correspondence information that stores the correspondence between the device and the device manager, and determines the device manager corresponding to the device as the device manager corresponding to the device identification information based on the information on the device included in the device identification information and the fourth correspondence information.

5. The information processing apparatus of claim 1, wherein the processor manages the third correspondence information that stores correspondence between the device manager and the one or more mediating devices and fifth correspondence information that stores correspondence between the device and the one or more mediating devices, and specifies the one or more mediating devices corresponding to the device by using the information on the device included in the device identification information and the fifth correspondence information and determines the device manager corresponding to the specified mediating device as the device manager corresponding to the device identification information based on the third correspondence information.

6. The information processing apparatus of claim 1, wherein in response to an acquisition request for information on the device or the one or more mediating devices from the device manager, the processor:

confirms the correspondence between the device or the one or more mediating devices and the device manager based on the correspondence information; and notifies the device manager that the device or the one or more mediating devices corresponding to the device manager does not exist when the correspondence between the device or the one or more mediating devices and the device manager cannot be confirmed.

7. The information processing apparatus of claim 6, wherein in response to the acquisition request for information on the device or the one or more mediating devices from the device manager, the processor:

confirms the correspondence between the device or the one or more mediating devices and the device manager based on the correspondence information; and transfers at least a part of the acquisition request for information to the device or the one or more mediating devices when the correspondence between the device or the one or more mediating devices and the device manager is confirmed.

8. The information processing apparatus of claim 1, wherein the processor:

manages predetermined identification information, accepts the request information from the device manager corresponding to the device manager identification information in response to a request information including the predetermined identification information and device manager identification information for identifying the device manager received from a request source having predetermined identification information different from the device manager, and executes the registration process corresponding to the request information.

9. A device management method executed by an information processing apparatus configured to communicate with one or more mediating devices that collect information on a device and one or more device managers that manage devices to be managed, the method comprising:

managing correspondence between the device or the one or more mediating devices and the one or more device managers, acquiring device identification information including information on the device or collected by the one or more mediating devices from the one or more mediating devices, identifying a device manager corresponding to the device identification information from among the one or more device managers based on the correspondence, and transmitting the device identification information to the corresponding device manager, wherein in response to a registration number issue request including manager identification information to identify the device manager from the device manager, the method further includes:

generating the registration number, managing the registration number in association with the manager identification information, transmitting the registration number to the device manager, and in response to a mediating device registration request including the registration number and the device identification information on the one or more mediating devices from the one or more mediating devices, managing the registration number and the device identification information included in the mediating device registration request in association with the manager identification information stored in association with the registration number included in the mediating device registration request, and identifying the corresponding device manager based on a correspondence between the device identification information and the manager identification information received from the one or more mediating devices.

10. The device management method of claim 9, further comprising:

managing first correspondence information that stores correspondence between account information for identifying an account and the device manager and second correspondence information that stores the correspondence between the account information and the one or more mediating devices;

specifying the account information corresponding to the one or more mediating devices that acquired the device identification information using the second correspondence information; and determining the device manager corresponding to the specified account information as the device manager corresponding to the device identification information based on the first correspondence information.

11. The device management method of claim 9, further comprising:

managing third correspondence information that stores the correspondence between the device manager and the one or more mediating devices; and determining the device manager corresponding to the one or more mediating devices that acquired the device identification information as the device manager corresponding to the device identification information based on the third correspondence information.

12. The device management method of claim 9, further comprising:

managing fourth correspondence information that stores correspondence between the device and the device manager; and determining the device manager corresponding to the device as the device manager corresponding to the device deification information based on the information on the device included in the device identification information and the fourth correspondence information.

13. The device management method of claim 9, further comprising:

managing the third correspondence information that stores correspondence between the device manager and the one or more mediating devices and fifth correspondence information that stores correspondence between the device and the one or more mediating devices;

specifying the one or more mediating devices corresponding to the device by using the information on the device included in the device identification information and the fifth correspondence information; and determining the device manager corresponding to the specified one or more mediating devices as the device manager corresponding to the device identification information based on the third correspondence information.

14. The device management method of claim 9, further comprising:

receiving an acquisition request for information on the device or the one or more mediating devices from the device manager;

confirming the correspondence between the device or the one or more mediating devices and the device manager based on the correspondence information; and notifying the device manager that the device or the one or more mediating devices corresponding to the device manager does not exist when the correspondence between the device or the one or more mediating devices and the device manager cannot be confirmed.

15. The device management method of claim 9, further comprising:

receiving the acquisition request for information on the device or the one or more mediating devices from the device manager;

confirming the correspondence between the device or the one or more mediating devices and the device manager based on the correspondence information; and transferring at least a part of the acquisition request for information to the device or the one or more mediating devices when the correspondence between the device or the one or more mediating devices and the device manager is confirmed.

16. The device management method of claim 9, further comprising:

managing predetermined identification information;

in response to a request information including the predetermined identification information and device manager identification information for identifying the device manager, received from a request source having predetermined identification information different from the device manager accepting the request information from the device manager corresponding to the device manager identification information; and executing the registration process corresponding to the request information.

17. A device management method executed by an information processing apparatus configured to communicate with one or more mediating devices that collect information on a device and one or more device managers that manage devices to be managed, the method comprising:

managing correspondence between the device or the one or more mediating devices and the one or more device managers, acquiring device identification information including information on the device or collected by the one or more mediating devices from the one or more mediating devices, identifying a device manager corresponding to the device identification information from among the one or more device managers based on the correspondence, and transmitting the device identification information to the corresponding device manager, wherein in response to a registration number issue request including manager identification information received from the device manager, the method further includes:

generating the registration number, managing the registration number in association with the manager identification information, transmitting the registration number to the device manager, and in response to a mediating device registration request including the registration number, the method includes:

generating device identification information to identify the one or more mediating devices, managing the generated device identification information in association with the manager identification information stored in association with the registration number included in the mediating device registration request, transmitting the generated device identification information to the one or more mediating devices to indicate that the registration of the mediating device is completed, and identifying the corresponding device manager based on a correspondence between the device identification information and the manager identification information received from the one or more mediating devices.

* * * * *